US008875188B2

(12) United States Patent
Christensen et al.

(10) Patent No.: US 8,875,188 B2
(45) Date of Patent: Oct. 28, 2014

(54) SYSTEMS, METHODS, AND DEVICES FOR SCANNING BROADCASTS

(75) Inventors: Kelly M. Christensen, Marina Del Rey, CA (US); John Phillip Hansen, Austin, TX (US); Thomas Daniel Mock, Sheffield, PA (US)

(73) Assignee: StratosAudio, Inc., Kirkland, WA (US)

( * ) Notice: Subject to any disclaimer, the term of this patent is extended or adjusted under 35 U.S.C. 154(b) by 1374 days.

(21) Appl. No.: 12/366,483

(22) Filed: Feb. 5, 2009

(65) Prior Publication Data
US 2009/0205000 A1 Aug. 13, 2009

Related U.S. Application Data

(60) Provisional application No. 61/026,433, filed on Feb. 5, 2008.

(51) Int. Cl.
*G06F 3/00* (2006.01)
*H04N 21/84* (2011.01)
*H04N 21/278* (2011.01)
*H04H 60/37* (2008.01)
*H04N 21/235* (2011.01)
*H04N 21/266* (2011.01)
*H04N 21/434* (2011.01)
*H04N 7/16* (2011.01)
*H04N 21/81* (2011.01)
*H04H 60/64* (2008.01)
*H04N 21/435* (2011.01)
*H04H 20/22* (2008.01)
*H04H 20/14* (2008.01)
*H04H 20/24* (2008.01)

(52) U.S. Cl.
CPC ............ *H04H 60/37* (2013.01); *H04N 21/84* (2013.01); *H04N 21/278* (2013.01); *H04H 20/22* (2013.01); *H04N 21/235* (2013.01); *H04N 21/26603* (2013.01); *H04N 21/4345* (2013.01); *H04H 20/14* (2013.01); *H04N 7/16* (2013.01); *H04H 20/24* (2013.01); *H04N 21/8113* (2013.01); *H04H 60/64* (2013.01); *A63F 2300/8023* (2013.01); *H04N 21/435* (2013.01)
USPC .......................................................... 725/61

(58) Field of Classification Search
CPC .................................................. H04N 21/4722
USPC ..................................... 725/61, 115; 709/219
See application file for complete search history.

(56) References Cited

U.S. PATENT DOCUMENTS 4,926,255 A 5/1990 Von Kohorn
5,134,719 A 7/1992 Mankovitz
(Continued)

FOREIGN PATENT DOCUMENTS

CA 2 316 925 7/1999
DE 44 27 046 2/1996
(Continued)

OTHER PUBLICATIONS

U.S. Appl. No. 10/806,084, filed Mar. 22, 2004, Christensen et al.
(Continued)

*Primary Examiner* — Nathan Flynn
*Assistant Examiner* — Alfonso Castro
(74) *Attorney, Agent, or Firm* — Knobbe Martens Olson & Bear LLP

(57) ABSTRACT

The various embodiments disclosed herein provide methods, systems, and devices for capturing broadcast streams, analyzing the broadcast streams to obtain information about the media content transmitted in the broadcast streams, obtaining additional information about the media content if available, and assigning a unique event identifier specific to the instance of broadcast of the broadcast stream and/or media segment transmitted in the broadcast stream. In other embodiments, the unique event identifier is broadcasted to broadcast receiving devices. With the unique event identifier, broadcast receiving devices can access the obtained information associated with the media content.

2 Claims, 12 Drawing Sheets

(56) References Cited

U.S. PATENT DOCUMENTS

| | | | |
|---|---|---|---|
| 5,303,393 | A | 4/1994 | Noreen et al. |
| 5,438,355 | A | 8/1995 | Palmer |
| 5,444,769 | A | 8/1995 | Koen et al. |
| 5,539,635 | A | 7/1996 | Larson, Jr. |
| 5,548,828 | A | 8/1996 | Kozaki et al. |
| 5,557,541 | A | 9/1996 | Schulhof et al. |
| 5,579,537 | A | 11/1996 | Takahisa |
| 5,661,787 | A | 8/1997 | Pocock |
| 5,708,478 | A | 1/1998 | Tognazzini |
| 5,752,159 | A | 5/1998 | Faust et al. |
| 5,857,156 | A | 1/1999 | Anderson |
| 5,872,589 | A | 2/1999 | Morales |
| 5,905,865 | A | 5/1999 | Palmer et al. |
| 5,907,793 | A | 5/1999 | Reams |
| 5,991,601 | A | 11/1999 | Anderson |
| 5,991,737 | A | 11/1999 | Chen |
| 6,035,177 | A * | 3/2000 | Moses et al. ............ 725/22 |
| 6,036,086 | A | 3/2000 | Sizer, II et al. |
| 6,098,106 | A | 8/2000 | Philyaw et al. |
| 6,202,210 | B1 | 3/2001 | Ludtke |
| 6,286,140 | B1 | 9/2001 | Ivanyi |
| 6,446,262 | B1 | 9/2002 | Malaure et al. |
| 6,463,469 | B1 | 10/2002 | Yavitz |
| 6,473,792 | B1 | 10/2002 | Yavitz et al. |
| 6,507,727 | B1 | 1/2003 | Henrick |
| 6,578,047 | B1 | 6/2003 | Deguchi |
| 6,611,201 | B1 | 8/2003 | Bishop et al. |
| 6,658,232 | B1 | 12/2003 | Johnson |
| 6,725,022 | B1 | 4/2004 | Clayton et al. |
| 6,829,486 | B2 | 12/2004 | McKenna et al. |
| 6,888,457 | B2 | 5/2005 | Wilkinson et al. |
| 6,928,423 | B2 | 8/2005 | Yamanaka |
| 6,941,154 | B1 | 9/2005 | Ritter |
| 6,957,041 | B2 | 10/2005 | Christensen et al. |
| 6,987,734 | B2 | 1/2006 | Hundemer |
| 6,990,312 | B1 | 1/2006 | Gioscia et al. |
| 7,054,653 | B2 | 5/2006 | Järvi et al. |
| 7,088,950 | B2 | 8/2006 | Tassberg et al. |
| 7,110,714 | B1 | 9/2006 | Kay et al. |
| 7,149,541 | B2 | 12/2006 | Rautila |
| 7,158,753 | B2 | 1/2007 | Kagan et al. |
| 7,190,971 | B1 | 3/2007 | Kawamoto |
| 7,194,235 | B2 | 3/2007 | Nykanen et al. |
| 7,260,842 | B2 | 8/2007 | Hirayama |
| 7,266,343 | B1 | 9/2007 | Yli-juuti et al. |
| 7,299,194 | B1 | 11/2007 | Manganaris et al. |
| 7,313,359 | B2 | 12/2007 | Steelberg et al. |
| 7,313,360 | B2 | 12/2007 | Steelberg et al. |
| 7,415,430 | B2 | 8/2008 | Christensen et al. |
| 7,415,526 | B2 * | 8/2008 | Hirayama ............ 709/231 |
| 7,500,256 | B1 | 3/2009 | Ohmae et al. |
| 7,647,609 | B2 | 1/2010 | Wachtfogel et al. |
| 7,773,939 | B2 | 8/2010 | Christensen et al. |
| 2001/0031013 | A1 | 10/2001 | Stetzler et al. |
| 2002/0026474 | A1 | 2/2002 | Wang et al. |
| 2002/0046407 | A1 | 4/2002 | Franco |
| 2002/0133824 | A1 | 9/2002 | Mensch |
| 2002/0178441 | A1 | 11/2002 | Hashimoto |
| 2003/0077065 | A1 * | 4/2003 | Scholten et al. ............ 386/46 |
| 2003/0086694 | A1 | 5/2003 | Davidsson |
| 2003/0097338 | A1 | 5/2003 | Mankovich et al. |
| 2003/0200543 | A1 | 10/2003 | Burns |
| 2004/0205810 | A1 | 10/2004 | Matheny et al. |
| 2004/0260682 | A1 * | 12/2004 | Herley et al. ............ 707/3 |
| 2005/0020223 | A1 * | 1/2005 | Ellis et al. ............ 455/186.1 |
| 2005/0021744 | A1 | 1/2005 | Haitsuka |
| 2005/0287972 | A1 * | 12/2005 | Christensen et al. ...... 455/186.1 |
| 2006/0174261 | A1 | 8/2006 | Cline, Jr. et al. |
| 2006/0184960 | A1 | 8/2006 | Horton et al. |
| 2007/0155311 | A1 | 7/2007 | Christensen et al. |
| 2007/0198353 | A1 | 8/2007 | Behringer et al. |
| 2007/0226146 | A1 | 9/2007 | Ruul |
| 2008/0049704 | A1 | 2/2008 | Witteman et al. |
| 2009/0104870 | A1 | 4/2009 | Christensen et al. |
| 2009/0104872 | A1 | 4/2009 | Christensen et al. |
| 2009/0177736 | A1 | 7/2009 | Christensen et al. |
| 2009/0183208 | A1 | 7/2009 | Christensen et al. |
| 2009/0204640 | A1 | 8/2009 | Christensen et al. |

FOREIGN PATENT DOCUMENTS

| | | |
|---|---|---|
| DE | 196 27 308 | 1/1998 |
| EP | 0713335 | 5/1996 |
| EP | 2250749 | 11/2010 |
| JP | 08-139624 | 5/1996 |
| JP | 10-135855 | 5/1998 |
| JP | 2000292182 | 10/2000 |
| KR | 10-1996-0033096 | 9/1996 |
| KR | 10-1998-0078248 | 11/1998 |
| WO | WO 90/00847 | 1/1990 |
| WO | WO 92/14222 | 8/1992 |
| WO | WO 94/02909 | 2/1994 |
| WO | WO 97/21291 | 6/1997 |
| WO | WO 97/42724 | 11/1997 |
| WO | WO 97/45814 | 12/1997 |
| WO | WO 99/18518 | 4/1999 |
| WO | WO 99/35771 | 7/1999 |
| WO | WO 99/35809 | 7/1999 |
| WO | WO 99/43109 | 8/1999 |
| WO | WO 00/19662 | 4/2000 |
| WO | WO 00/78050 | 12/2000 |
| WO | WO 01/01331 | 1/2001 |
| WO | WO 01/57759 | 8/2001 |
| WO | WO 01/77779 | 10/2001 |
| WO | WO 02/23773 | 3/2002 |
| WO | WO 2006/122028 | 11/2006 |
| WO | WO 2008/002000 | 1/2008 |

OTHER PUBLICATIONS

U.S. Appl. No. 12/897,509, filed Oct. 4, 2010, Christensen et al.
"Bookmark Your World", 1999-2000 Xenote, www.xenote.com.
"Sirus to Add 'Instant Buy' Button," Mar. 13, 2000, Twice, V 15, n 7, p. 28.
Jan. 25, 2000, Showcase 2000—Xenote Press Release re Xenote iTag, www.xenote.com/html/press/releases.html.
International Search Report and Written Opinion for International Application No. PCT/US2009/033256, Notification mailed Nov. 6, 2009.
Office Action in European Application No. 09709324.9 mailed on Sep. 25, 2010.
Response to Sep. 25, 2010 European Office Action filed on Oct. 25, 2010.

* cited by examiner

| Media Data Storage | | | | | | | | | | | |
|---|---|---|---|---|---|---|---|---|---|---|---|
| BROADCAST STREAM | | | | | | | | | | | |
| | Unique Event Identifier | Title | Source of Transmission | Transmission | Time | Date | Month | Year | Key Terms | Media Type | Digital Fingerprint |

| Media Data Storage | | |
|---|---|---|
| *DEVICE INFORMATION* | | |
| Owner | | |
| Capacity | | |
| Status | | |
| Preference | | |
| Push/Pull | | |
| Automatic/Periodic/Manual | | |
| User Responses | | |
| Vote | | |
| Purchase | | |
| Recommend | | |
| Display Preference | | |
| Content Identifier | | |

SYSTEMS, METHODS, AND DEVICES FOR SCANNING BROADCASTS

CROSS-REFERENCE TO RELATED APPLICATIONS

The present application claims the benefit under 35 U.S.C. 119(c) to U.S. Provisional Application No. 61/026,433, filed Feb. 5, 2008, which is hereby incorporated by reference in its entirety, including specifically but not limited to the systems, methods, and devices relating to scanning broadcasts.

BACKGROUND

1. Field

The disclosure relates generally to the field of broadcasting, and in particular methods, systems, and devices for scanning broadcasts.

2. Description of the Related Art

The traditional broadcasting industry, including radio and television, is a multi-billion dollar industry with hundreds of millions of listeners, viewers, and users. Traditional broadcasting is generally a one way medium wherein content and/or data is distributed from broadcasters to users. The same is generally true for new broadcast mediums, such as internet broadcasting, podcasting, and the like. Additionally, when a user is watching or listening to media on a media player, such as an IPOD®, the ability to interact with such broadcasts is limited. New technologies are being developed to allow users to interact with both traditional and new broadcast media.

SUMMARY

In certain embodiments, a centralized broadcast scanning system comprising: a stream scanner module fixed at a specific location, the stream scanner module configured to receive a plurality of broadcast streams from a plurality of broadcast sources, wherein each of the plurality of broadcast streams comprise at least a media content; a dedicated scanning system module configured to periodically sample a specific broadcast stream from a specific broadcast source and to receive at least one alternate data stream pertaining to the media content in the specific broadcast stream, wherein the alternate data stream is from at least one alternate source; a stream analysis module configured to process the specific broadcast stream to determine an identification of the media content in the specific broadcast stream, wherein the determination is based at least on the media content and the alternate data stream; a data mining and reporting system module configured to generate a database entry comprising at least the identification of the media content from the stream analysis module; a central management module configured to assign the media content a unique event identifier, wherein the unique event identifier is unique to a specific instance of the media content in the specific broadcast stream; a media storage database module configured to store in the media storage database at least the unique event identifier and the database entry, wherein the unique event identifier is database linked to the database entry; and a device monitoring module configured to access from a plurality of user devices the specific broadcast stream received by each of the plurality of user devices, to communicate to a specific user device the unique event identifier of each specific instance of the media content in the specific broadcast stream received by the specific user device and to obtain from the specific user device at least one of the unique event identifiers communicated to the specific user device, wherein the unique event identifier obtained is used to obtain the database entry in the storage database.

In some embodiments, a distributed broadcast scanning system comprising: a central management module configured to electronically communicate with a plurality of broadcast receiving devices, wherein each broadcast receiving device comprises at least: a stream scanner module configured to receive a specific broadcast stream from a broadcast source, wherein the broadcast stream comprises at least a media content and an associated data linked to the media content; a stream analysis module configured to analyze the specific broadcast stream to determine an identification of the media content in the specific broadcast stream, wherein the determination is based at least in part on the associated data; a distributed scanning management system module configured to generate a database entry comprising at least the identification of the media content from the stream analysis module and to transmit the database entry to the central management module; the central management module is further configured to comprise at least: a management module configured to process the database entry and to assign the media content a unique event identifier, wherein the unique event identifier is unique to a specific instance of the media content in the specific broadcast stream; a media storage database module configured to store in a media storage database at least the unique event identifier and the database entry, wherein the unique event identifier is database linked to the database entry; and a device monitoring module configured to transmit the unique identifier to at least one of the plurality of broadcast receiving devices.

In certain embodiments, a method for uniquely identifying media, comprising in no particular order; obtaining a transmission of a media segment; analyzing the media segment to identify the content; assigning a unique identifier that uniquely identifies the specific instance of transmission of the media segment; storing the unique identifier in a database and at least part of the analyses of the media segment identifying the content of the media segment; transmitting the unique identifier to a plurality of user devices accessing the media segment; and obtaining from at least one of the plurality of user device a user interaction with the media segment and at least the unique identifier associated with the specific instance of the transmission of the media segment.

In some embodiments, a method for uniquely identifying media, comprising in no particular order; obtaining a data stream associated with a transmission of a media segment; extracting at least an associated data from the data stream; analyzing the associated data extracted from the data stream; assigning a unique identifier that uniquely identifies the specific instance of the transmission of the media segment; and storing the unique identifier in a database and at least part of the analyses of the associated data extracted from the data stream; transmitting the unique identifier to a plurality of user devices accessing the media segment; and obtaining from at least one of the plurality of user device a user interaction with the media segment and at least the unique identifier associated with the specific instance of the transmission of the media segment.

In certain embodiments, a method for associating a unique identifier specific to a instance of a media segment in a data stream with the media segment in a user device, the method comprising: obtaining a transmission of the media segment from a broadcast source; transmitting at least enough data to identify the broadcast source to a broadcast scanning system; accessing from the broadcast scanning system the data stream associated with the media segment; extracting from the data stream at least the unique identifier specific to the instance of the media segment; presenting at least the specific instance of the media segment to a user of the user device; detecting a user input regarding the specific instance of the media segment; and transmitting at least the unique identifier specific to the instance of the media segment.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

These and other features will now be described with reference to the drawings summarized below. The drawings and the associated description are provided to illustrate one or more preferred embodiments of the invention, and not to limit the scope of the invention.

FIG. 9 illustrates one embodiment of various types of data that are stored in the media storage device and/or are related to a broadcast stream.

FIG. 10 illustrates one embodiment of various types of data that are stored in the media storage device and/or are related to a broadcast receiving device.

DETAILED DESCRIPTION OF THE EMBODIMENTS

Figure 1:
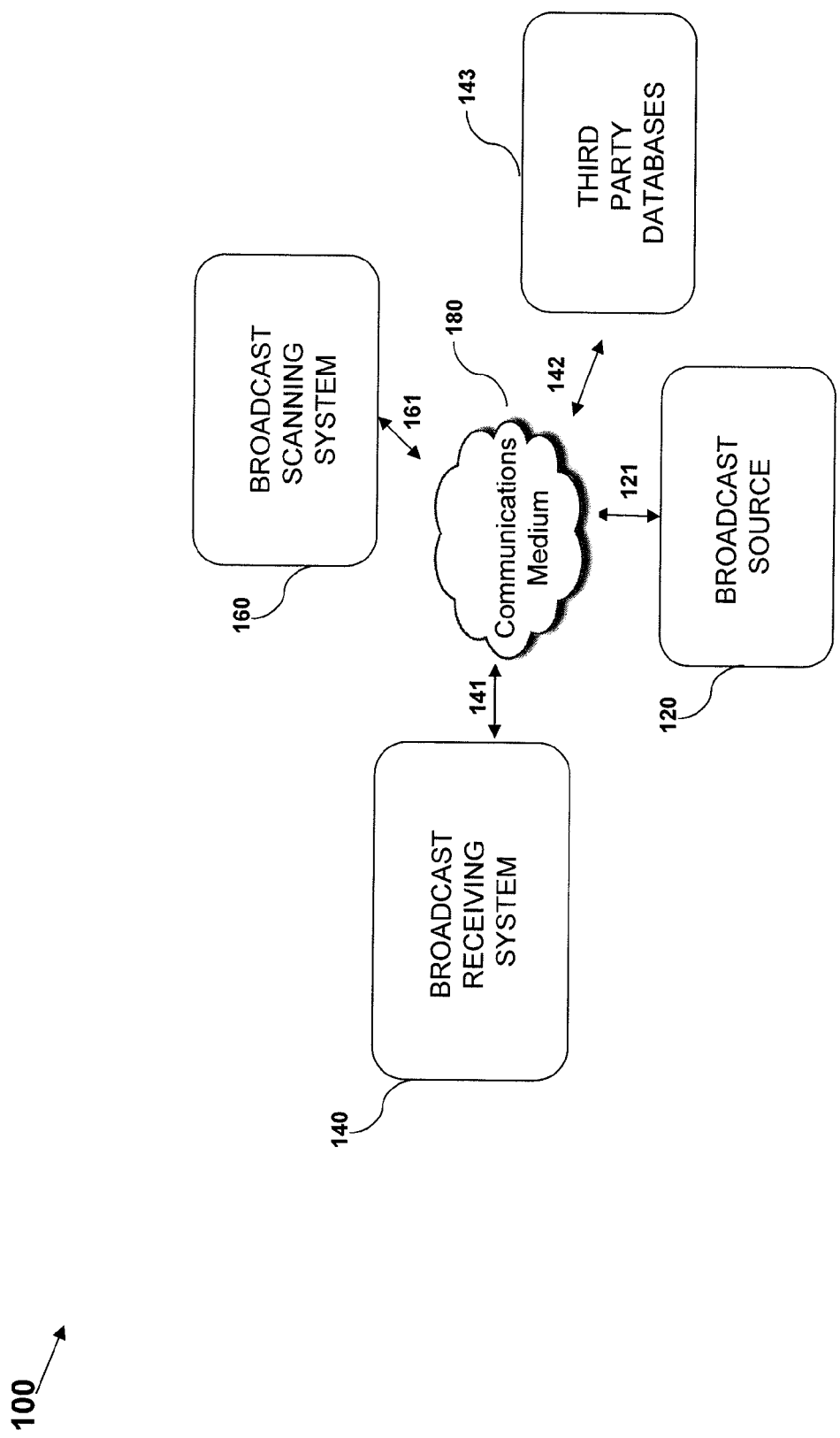
FIG. 1 illustrates a high-level block diagram of one embodiment of a broadcast system comprising a broadcast scanning system.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

The various embodiments disclosed herein provide methods, systems, and devices for capturing broadcast streams, analyzing the broadcast streams to obtain information about the media content transmitted in the broadcast streams, obtaining additional information about the media content if available, and assigning a unique event identifier specific to the instance of broadcast of the broadcast stream and/or media segment transmitted in the broadcast stream. In other embodiments, the unique event identifier is broadcasted to broadcast receiving devices. With the unique event identifier, broadcast receiving devices can access the obtained information associated with the media content.

The terms "broadcast" or "broadcast stream" or "broadcast signal" or "media stream" as used herein are interchangeable and the terms broadly refer to, without limitation, data, information or programming distributed over a wide variety of media such as terrestrial radio, over-the-air (or terrestrial) television, cable, satellite, internet, Wi-Fi, Bluetooth, cellular and/or mobile networks, peer-to-peer networks, Local Area Networks (LAN's), Wide Area Networks (WAN's), combinations of the same, or the like. Broadcasts, broadcast streams, broadcast signals and/or media streams can be of the type, without limitation, textual, audio-visual, and/or visual, and/or can comprise content such as television shows, movies, news, radio programming, advertisements, public announcements, news, pictures, videos, letters, emails, podcasts, combinations of the same, or the like.

The terms "broadcast source" or "broadcaster" are interchangeable as used herein, and all terms broadly comprise systems and/or devices that transmit broadcast streams, comprising without limitation broadcast stations and/or towers that transmit radio and/or television signals, servers and/or other devices that push data feeds over wired and/or wireless networks, such as the internet, LAN's, WAN's, combinations of the same, or the like.

The terms "scanning" or "scan" as used herein broadly refer to the process of capturing any type of broadcast from the source and/or from a data stream, comprising broadcast streams from broadcast systems. The terms "scanner" and "broadcast scanning system" are interchangeable and broadly refer to devices that are capable of capturing a broadcast. A scanner can be without limitation incorporated into other devices, such as televisions, radios, computers, laptops, cell phones and/or other wireless devices, PDAs, cable and/or satellite boxes, combinations of the same, or the like.

As used herein, the terms "broadcast receiving device" or "broadcast receiving system" refers to any device or plurality of devices that are capable of receiving broadcast streams, and a broadcast receiving device can without limitation be incorporated into other devices, such as a personal computer, a laptop computer, a cellular phone, a GPS system, a Blackberry® device, a portable computing device, a server, a computer workstation, a local area network of individual computers, an interactive kiosk, a personal digital assistant, an interactive wireless communications device, a digital media player, a handheld computer, an embedded computing device, cable and/or satellite boxes, other home and/or audio entertainment devices, combinations of the same, or the like. Broadcast receiving devices can also comprise a scanner.

As used herein, the terms "data stream," "alternate broadcast stream," "alternate broadcast signal," "alternate data stream," "other media stream," "other data stream," "subcarrier data stream," "accompanying stream," "associated data stream," "IP data stream," or "closed captioning data stream" broadly refer to any type of data or information pertaining to a broadcast stream. Data stream, alternate broadcast stream, alternate broadcast signal, alternate data stream, other media stream, other data stream, subcarrier data stream, accompanying stream, associated data stream, IP data stream and/or closed captioning data stream can be of the type, without limitation, ancillary data pertaining to a media stream such as: Internet Protocol's, XML, SOAP, PERL, J2ME, JAVA, GPRS, HSDPA/UMTS/3G, RBDS, RDS, DARC, GPRS, Program Associated Data (PAD), In Band On Channel (IBOC), Digital Radio Mondiale (DRM), digital radio, digital television, streaming media, open or closed captioning and/or transcripts, combinations of the same, or the like.

The terms "broadcast network," "network," or "communications medium" as used herein are interchangeable and refer to any type of communications medium (unidirectional and/or bidirectional) wherein a broadcast source(s), a broadcast receiving device(s), and/or a broadcast scanning device(s) can communicate with the internet and/or other third party databases. For example, in a radio broadcast network, a radio station transmits radio broadcast signals to a plurality of radio receivers. Broadcast networks comprise mono-directional systems and/or bi-directional systems. Other examples of broadcast networks comprise but are not limited to broadcasting to broadcast receiving devices and/or scanners over airwaves, subcarrier channels and/or frequencies, cable and/or satellite, cellular and/or wireless connections, internet, virtual private network (VPN) connections over the internet, private networks (for example, ISDN, T1, combinations of the same, or the like.), wireless and/or wired direct connections between two or more devices, combinations of the same, or the like.

The term "unique event identifier," as used herein is a broad term that refers to any means for identifying a specific instance of the broadcast stream. In certain embodiments, a broadcaster may generate its own "broadcaster media event identifier" that may be specific to the instance of the broadcast, and/or that is separate from the "unique event identifier."

The terms "digital fingerprint" or "fingerprint" as used herein can comprise without limitation least-squares spectral analysis (LSSA), hash-sums, wave form analysis, spectral analysis, harmonic analysis, watermarking, combinations of the same, or the like. As used herein, the term "media content" refers to content being broadcasted in the broadcast stream. For example, media content can comprise a song, a video, a program, a show, an advertisement, combinations of the same, or the like.

The terms "computer," "computer server," "computing system," "computer clients," "servers," or "computing system devices," as used herein are interchangeable terms, and the terms broadly refer, without limitation, to a machine that manipulates data according to a list of instructions, combinations of the same, or the like.

FIG. 1 is a high-level block diagram illustrating one embodiment of a broadcast system 100. As illustrated, the broadcast system 100 comprises a broadcast source 120, a broadcast receiving system 140, a broadcast scanning system 160, third party databases 143 and a network 180. In the illustrated embodiment of FIG. 1, the broadcast source 120, the broadcast receiving system 140, third party databases 143, and the broadcast scanning system 160 communicate with each other through the network 180.

With reference to FIG. 1, the broadcast source 120, in one embodiment, can be a radio station; the broadcast receiving system 140 can comprise one or more radio tuners; and/or the broadcast scanning system 160 can be a standalone device, wherein both the radio tuners and/or the scanner are configured to receive a broadcast stream 121 from the radio station 120. In FIG. 1, the broadcast source 120 is located at a distance from the broadcast receiving system 140 and/or the broadcast scanning system 160. In other embodiments, the broadcast source 120, the broadcast receiving system 140, and the broadcast scanning system 160 can be on the same device, for example, a media player. In some embodiments, the broadcast receiving device 140 and the broadcast scanning system 160 can be on the same device. For example, the broadcast receiving device 140 can be a cellular phone that is enabled to receive radio and/or television broadcast streams 121, and the cellular phone is also configured to be a scanner that scans the broadcast stream 121 being received.

Referring to FIG. 1, the broadcast stream 121 can be transmitted using the airwaves, subcarrier channels and/or frequencies, satellite, cable, cellular, wireless, internet, wired direct connections between two or more devices, combinations of the same, or the like. In other embodiments, the broadcast source 120 may transmit a broadcast stream in conformance with various radio standards, such as the Radio Broadcast Data System (RBDS) standard. The broadcast source 120 may transmit the broadcast stream 121 in many other forms, comprising satellite radio, satellite television, radio, cable television, internet, digital radio, IP data streams, media being played on media devices, such as an IPOD, combinations of the same, or the like.

In one embodiment, network 180 uses the same communication means to enable communication between broadcast source 120, broadcast receiving device 140 and broadcast scanning system 160. Network 180 can use a plurality of communication means to enable communication between broadcast source 120, broadcast receiving device 140 and/or broadcast scanning system 160. In some embodiments, the communication means in network 180 between broadcast source 120 and broadcast receiving device 140 is distinct from the communication means in network 180 between broadcast scanning system 160 and broadcast receiving device 140. In certain embodiments, the communication means in network 180 from broadcast scanning system 160 and broadcast receiving device 140 is distinct from the communication means in network 180 from broadcast receiving device 140 and broadcast scanning system 160. In one embodiment, the communication means in network 180 from broadcast scanning system 160 and broadcast receiving device 140 is the same as the communication means in network 180 from broadcast receiving device 140 and broadcast scanning system 160. In some embodiments, the communication means in network 180 to enable communication between broadcast source 120, broadcast receiving device 140 and broadcast scanning system 160 are all unidirectional communication means. In one embodiment, the communication means in network 180 to enable communication between broadcast source 120, broadcast receiving device 140 and broadcast scanning system 160 are all bidirectional communication means. In certain embodiments, the communication means in network 180 to enable communication between broadcast source 120, broadcast receiving device 140 and broadcast scanning system 160 are a mixture of unidirectional communication means and bidirectional communication means. In one embodiment, the communication means in network 180 to enable communication between broadcast source 120, broadcast receiving device 140 and broadcast scanning system 160 are initiated by a request from the receiving device. In some embodiments, the communication means in network 180 to enable communication between broadcast source 120, broadcast receiving device 140 and broadcast scanning system 160 are initiated by the sending device. In one embodiment, the communication means in network 180 to enable communication between broadcast source 120, broadcast receiving device 140 and broadcast scanning system 160 are initiated by a mixture of requests from the receiving device and initiation of communication by the sending device. In certain embodiments, the broadcast scanning system 160 operation is independent from the operation of the broadcast source 120. In one embodiment, the broadcast scanning system 160 operation is coordinated with the operation of the broadcast source 120. In some embodiments, the communication means in network 180 to enable communication between broadcast source 120, broadcast receiving device 140 and broadcast scanning system 160 is a public broadcast. In one embodiment, the communication means in network 180 to enable communication between broadcast source 120, broadcast receiving device 140 and broadcast scanning system 160 is a private communication. In certain embodiments, the communication means in network 180 to enable communication between broadcast source 120, broadcast receiving device 140 and broadcast scanning system 160 is mixture of public broadcast and private communication. In one embodiment, some or all of the communication means in network 180 to enable communication between broadcast source 120, broadcast receiving device 140 and broadcast scanning system 160 are encrypted.

Broadcast stream 121, broadcast receiver link 141, third party database link 142 and/or broadcast scanning system link 161 represent the data that flows from their respective sources, through the communication means 180 to their destinations and the data that flows to their respective destinations from their sources. The nature of the data, the protocols used to transmit the data and whether the data is unidirectional or bidirectional depends on the nature of the source, destination, communication means 180 and the data being transmitted.

Figure 2:
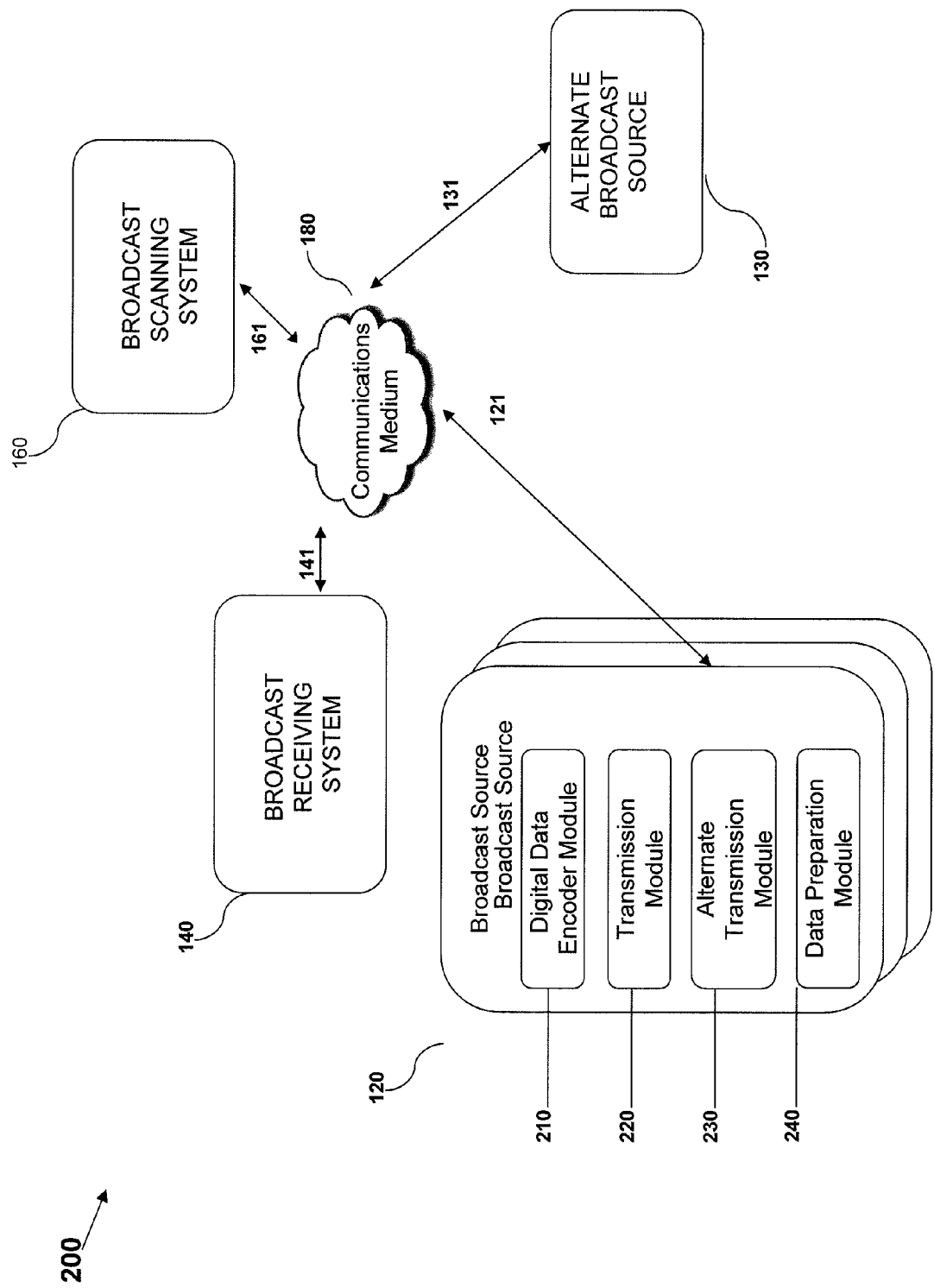
FIG. 2 illustrates a block diagram of one embodiment of a broadcast system with an expanded view of one embodiment of a broadcast source.

FIG. 2 illustrates a block diagram of one embodiment of a broadcast system 200, comprising an alternate broadcast source 130 and an illustration of one embodiment of the structural elements of the broadcast source 120. The broadcast source 120 comprises a digital data encoder module 210, a transmission module 220, an alternative transmission module 230, and a broadcast data preparation module 240.

In general, the word "module" as used herein refers to logic embodied in hardware and/or firmware, and/or to a collection of software instructions, possibly having entry and/or exit points, written in a programming language, such as, for example, Java, and/or the Java Platform-Micro Edition (Java ME, and/or J2ME), comprising the Java Specification Request 234 (JSR 234) Advanced Multimedia Supplements, an application program including pseudocode interpretable instructions, WAP, HTML, combinations of the same, or the like. Other programming languages comprise without limitation COBOL, CICS, Lua, C, C++, C#, Perl, VB.Net, PHP, mySQL and/or SQL. A software module may be compiled and/or linked into an executable program, installed in a dynamic link library, and/or may be written in an interpreted programming language such as, for example, BASIC, Perl, and/or Python. It will be appreciated that software modules may be callable from other modules and/or from themselves, and/or may be invoked in response to detected events and/or interrupts. Software instructions may be embedded in firmware, such as an EPROM. It will be further appreciated that hardware modules may comprise connected logic units, such as gates and/or flip-flops, and/or may comprise programmable units, such as programmable gate arrays and/or processors. The modules described herein can be implemented as software modules, and/or may be represented in hardware and/or firmware. Generally, the modules described herein refer to logical modules that may be combined with other modules and/or divided into sub-modules despite their physical organization and/or storage.

In reference to FIG. 2, the broadcast data preparation module 240 prepares data for broadcast transmission. In one embodiment, the prepared data contains information pertaining to the broadcast stream 121 that the broadcast source 120 transmits using the broadcast scanning system 160 and/or the broadcast receiving system 140. For example, the broadcast data preparation module 240 may prepare data for the broadcast source 120 containing the title of a song and/or name of an artist to broadcast in concert with a music piece, and/or the name of a product and/or the associated advertiser. Other information that the broadcast data preparation module 240 can prepare for the broadcast source 120 may comprise data such as the album containing the aired song, a purchase price for content and/or advertised products, a purchase location, closest merchant, a content identifier and/or a broadcaster media event identifier specific to the instance of broadcast to later recall the particular transmission from a media storage database.

The broadcast source 120 illustrated in FIG. 2 comprises the digital data encoder module 210, which can be configured to generate signals for the broadcast source 120 to transmit along with the regular broadcast stream. In one embodiment, the digital data encoder module 210 generates signals in compliance with the RBDS and/or Radio Data System (RDS) standard to accompany the broadcast stream 121. The digital data encoder module 210 generates a 57 kHz "subcarrier" signal that modulates along with an FM station broadcast signal and can be demodulated by special decoders. Commercially available RBDS encoders usually accept information via IP data ports, serial and/or parallel data ports and format the information into the appropriate RBDS block type. The digital data encoder module 210 of FIG. 2 can also represent systems that can be configured to generate other types of accompanying data, comprising those in accordance with RDS, Data Radio Channel (DARC), Digital Audio Broadcasting (DAB), Digital Multimedia Broadcasting (DMB), Digital Video Broadcast-Handhelds (DVB-H), In Band on Channel (IBOC), Digital Radio Mondiale, combinations of the same, or the like. In one embodiment, the digital data encoder module 210 generates closed captioning data stream to accompany a television broadcast.

The digital data encoder module 210 can generate signals for the broadcast source 120 to transmit, whereby the generated signals are tightly integrated into the broadcast stream 121. For example, the digital data encoder module 210 can integrate various transmission forms (for example, Radio Data Service as a sub-carrier to an FM broadcast). The digital data encoder module 210 can also generate discrete transmission signals for the broadcast source 120 to transmit whereby the generated signals are loosely integrated with the broadcast stream 121 that the broadcast source 120 transmits. One example of discrete transmission is a generated signal that travels using a distinctly different transmission method from the broadcast stream 121 (for example, satellite radio and/or internet). Various combinations of the two methods above (tightly integrated transmission methods and discreet transmission methods) may be employed. The broadcast stream 121 that is transmitted by the broadcast source 120 can be in multiple forms using different aspects of the two methods.

The broadcast source 120 also comprises the transmission module 220, which transmits the primary broadcast streams for the broadcast source 120. For example, the transmission module 220 transmits radio signals for a radio station. In one embodiment, the transmission module 220 transmits television signals for a television station. The transmission module 220 can be configured to transmit the broadcast stream 121 over many other forms, comprising without limitation satellite radio, satellite television, radio, cable television, internet, digital radio, IP data streams, media being played on a digital media devices such as the IPOD, combinations of the same, or the like.

The broadcast source 120 may also comprise the alternate transmission module 230. The alternate transmission module enables the broadcast source 120 to transmit broadcast signals that are in a different form than the primary broadcast stream transmitted by the broadcast source 120. For example, the broadcast source 120 can be a television station that primarily broadcasts analog or digital television signals that are transmitted through airwaves. The primary broadcast stream transmitted by the broadcast source 120 may or may not contain a subcarrier generated by the digital data encoder module 210 (for example, closed captioning). The primary broadcast is transmitted by the transmission module. The alternate transmission module enables the broadcast source 120 to transmit the television broadcast over a different medium, for example, the internet, satellite, cable, cellular wireless and/or other wireless transmission, combinations of the same, or the like.

FIG. 2 also illustrates the alternate broadcast source 130 that transmits the alternate broadcast stream 131 to the broadcast receiving system 140 and the broadcast scanning system 160 via the network 180. The alternate broadcast source 130 can comprise similar characteristics as the broadcast source 120, and/or can comprise many sources of broadcast, for example, FM radio, cable television, satellite radio, internet, digital radio, IP data streams, combinations of the same, or the like. Although FIG. 2 shows three broadcast sources 120 and one alternate broadcast source 130, it will be recognized that any number of systems can provide a broadcast. Further, it will also be recognized that the broadcast scanning system 160 and/or the broadcast receiving system 140 in FIG. 1 and FIG. 2 and other figures can receive a broadcast from the broadcast source 120, alternate broadcast 130, and any other broadcast sources that may be present in the system.

As FIG. 1 further illustrates, the broadcast receiving system 140 receives transmissions of the broadcast stream 121 from the broadcast source 120 using link 141. Any number of broadcast receiving devices capable of receiving a broadcast stream can comprise the broadcast receiving system 140. In one embodiment, the broadcast receiving devices 140 comprise personal computers, laptop computers, cellular phones, wireless devices, GPS systems, Blackberry® devices, portable computing devices, servers, computer workstations, local area network of individual computers, interactive kiosks, personal digital assistants, personal digital media players, interactive wireless communications devices, handheld computers, embedded computing device, combinations of the same, or the like. In other embodiments, the broadcast receiving devices 140 can comprise television sets, radio receivers, mobile media devices, cable boxes, satellite receivers, other home and/or audio entertainment devices, combinations of the same, or the like.

In FIG. 2, the broadcast receiving system 140 is in communication with the broadcast scanning system 160 via the network 180. The broadcast scanning system 160 can receive device broadcast stream 141 from the broadcast receiving system 140. For example, the broadcast scanning system 160 can obtain the status of the broadcast receiving system 140 (for example, the on/off status of the device, a change of broadcast station request by a user, an identification of the program media content currently playing on the device, activities generated by the user in response to the broadcast stream, whether a radio or a digital media player is on, combinations of the same, or the like.) from the broadcast receiving devices 140.

Referring to FIG. 2, the broadcast scanning system 160 can also capture the broadcast stream being received by the broadcast receiving system or device 140, thereby allowing the broadcast scanning system 160 to track the specific broadcast stream being received by the broadcast receiving devices 140. The broadcast receiving system 140 can also be configured to receive a content identifier, a broadcaster media event identifier, a unique event identifier and/or any combination of identifiers from the broadcast scanning system 160. In one embodiment, the broadcast scanning system 160 conducts an analysis of the broadcast stream 121 to determine the media content within the broadcast stream 121, assigns a unique event identifier to the specific instance of the broadcast stream, and/or sends the unique event identifier along with any other relevant information from the broadcast scanning system 160 to the broadcast receiving devices 140 that are receiving the broadcast stream 121 from the broadcast source 120.

With reference to FIG. 1, the broadcast scanning system 160 depicted in FIG. 1 scans the broadcast stream 121 transmitted by the broadcast source 120. In one embodiment, the broadcast scanning system 160 captures various broadcast streams 121 comprising analog/digital radio and/or television transmissions; satellite and/or cable transmissions; internet, Wi-Fi and/or peer-to-peer broadcasts; combinations of the same, or the like.

The broadcast scanning system 160 can be configured to access other data streams that accompany the broadcast stream 121 and/or are different from the broadcast stream 121 in order to analyze the broadcast stream 121. For example, the broadcast scanning system 160 can be configured to scan a subcarrier data stream that accompanies the broadcast stream 121 to obtain information about the broadcast stream 121. The subcarrier data stream can comprise data segments that can be as small as a single bit or as large as multiple files, the segments of which taken together, make up the data stream. The broadcast scanning system 160 may further scan other media streams that accompany the broadcast stream 121 (for example, RBDS, RDS, DRM, DARC, DAB, DMB, D-VBH, IBOC, combinations of the same, or the like). The broadcast scanning system 160 may also scan the same media content that is being broadcasted from different broadcast sources, such as the transmission module 220 and/or the alternate transmission module 230 illustrated in FIG. 2. For example, some FM broadcast stations, using their website, broadcast their media content over the airwaves and over the internet. The broadcast scanning system 160 can be configured to capture both the broadcast stream from the airwaves and the internet, together or separately.

Additionally, the broadcast scanning system can be configured to access the accompanying and/or other broadcast streams transmitted by the broadcast source. The ability to scan accompanying and/or other broadcast streams allows the broadcast scanning system 160 to capture additional identifying information about the broadcast stream 121 that might not be available by analyzing the broadcast stream 121 alone. For example, some FM broadcast stations, using their website, not only broadcast their media content over the airwaves and the internet but also broadcast and display the artist and title of the media content being broadcasted. The broadcast scanning system 160 can be configured to capture not only the media content from the airwaves and/or internet broadcast streams but also the artist, title, album, date, ad, advertiser, graphics, lyrics, concert and/or event information, time, call letters, duration and/or other relevant data from the station's website.

The broadcast scanning system 160, as illustrated in FIG. 2, can access the alternate broadcast stream 131 transmitted by the alternate broadcast source 130. The broadcast scanning system 160 can use the alternate broadcast stream 131 that is associated with the broadcast stream 121 to obtain even more information about the broadcast stream 121. For example, the broadcast scanning system 160 may capture data that is associated with the broadcast stream 121 but that does not accompany the broadcast stream 121. The ability to access alternate sources of broadcast enables the broadcast scanning system 160 to obtain additional information as to what is contained in the broadcast stream 121. In one example, the broadcast scanning module scans a transcript of a show transmitted by the alternate broadcast source 130 using the alternate broadcast stream 131 to further associate the transcript with the original programming transmitted using the broadcast stream 121. In one embodiment, the alternate broadcast source 130 transmits the alternate broadcast stream 131 to the scanning system using the internet.

Referring back to FIG. 1, the broadcast scanning system 160 can further access sources and/or destinations of broadcast streams to obtain more information about broadcast streams. In one embodiment, the broadcast scanning system 160 is accessing the broadcast source 120 of the broadcast stream 121 to obtain information about the broadcast stream 121. The broadcast scanning system 160 can also be configured to access the destination of the broadcast stream 121 to obtain information about the broadcast stream 121. The broadcast scanning system 160 can extract information about the media content transmitted in the broadcast stream 121 by analyzing the broadcast stream 121, the data streams that accompany the broadcast stream 121, the alternate broadcast streams 131, the subcarrier data streams associated with the broadcast stream 121, the source of the broadcast stream 121, and/or the destination of the broadcast stream 121.

In one embodiment, broadcast source 120 utilizes a plurality of communication means within network 180 to communicate with broadcast receiving device 140. In one embodiment, broadcast source 120 utilizes one communication means within network 180 to communicate data with broadcast receiving device 140 and a different communication means within network 180 to communicate media with broadcast receiving device 140. In one embodiment, broadcast source 120 utilizes the same communication means within network 180 to communicate data and/or media with broadcast receiving device 140. In one embodiment, broadcast source 120 and alternate broadcast source 130 utilize the same communication means in network 180 to communicate with broadcast receiving device 140. In one embodiment, broadcast source 120 and alternate broadcast source 130 utilize different communication means in network 180 to communicate with broadcast receiving device 140. In one embodiment, the communication means in network 180 between broadcast source 120 broadcast scanning system 160 is the same as the communication means in network 180 between alternate broadcast source 130 and broadcast scanning system 160. In one embodiment, the communication means in network 180 between broadcast source 120 broadcast scanning system 160 is different from the communication means in network 180 between alternate broadcast source 130 and broadcast scanning system 160. In one embodiment, the broadcast scanning system determines which of a plurality of broadcast sources 120 will be received based on information from broadcast receiving device 140.

Figure 3:
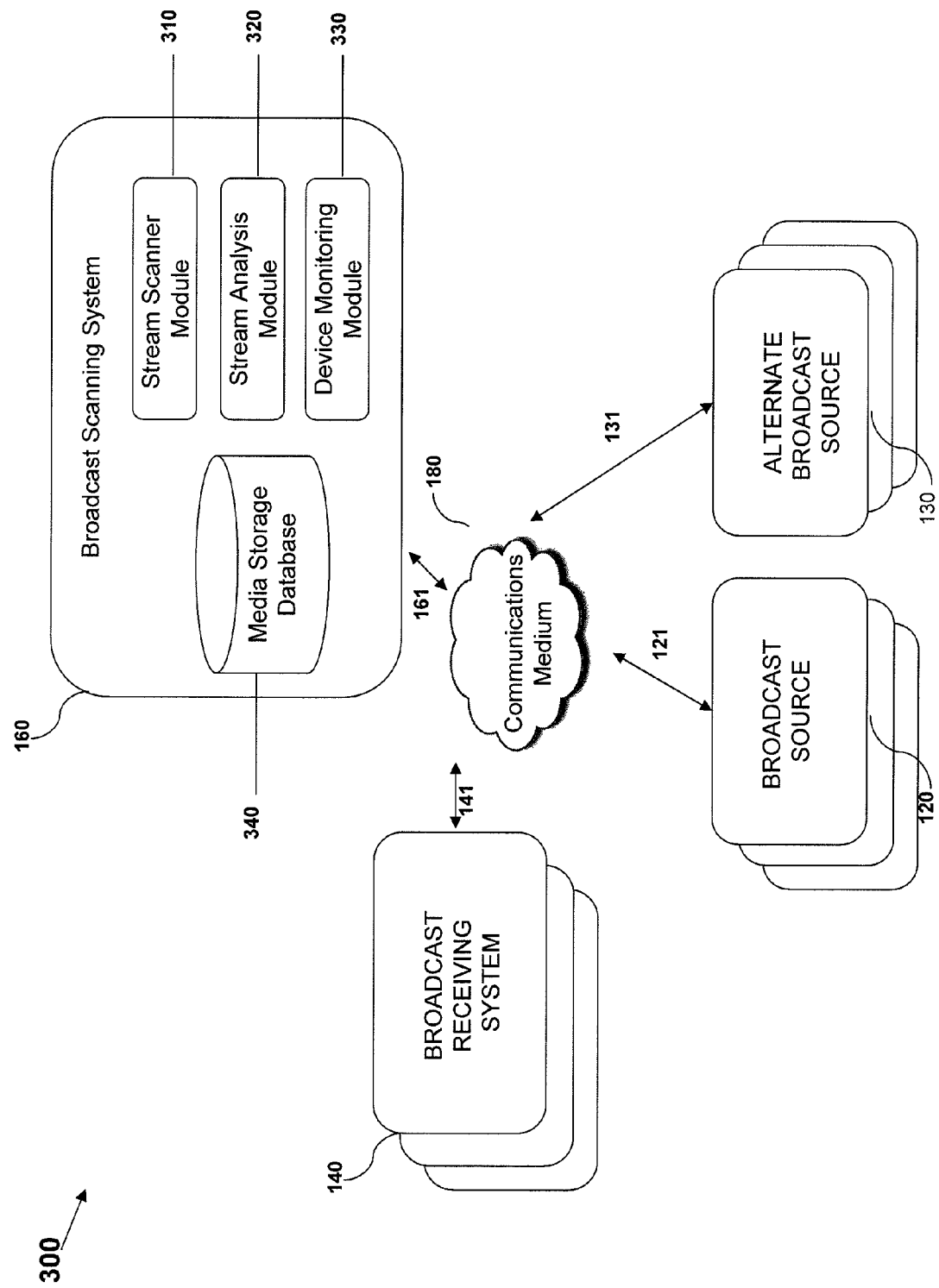
FIG. 3 illustrates a block diagram of one embodiment of a broadcast scanning system with an expanded view of one embodiment of the broadcast scanning system.

FIG. 3 illustrates the broadcast system 300 with a detailed view of one embodiment of the broadcast scanning system 160. In the illustrated embodiment, the broadcast scanning system 160 comprises a stream analysis module 320, a stream scanner module 310, device monitoring module 330, and a media storage database 340.

Referring to FIG. 3, the stream scanner module 310 obtains the broadcast stream 121 transmitted by the broadcast source 120 via 161. One of ordinary skill in the art will recognize that the stream scanner module 310 can obtain any broadcast stream transmitted over various broadcast mediums comprising, for example, AM, FM, IBOC, internet, satellite, Digital Radio Mondiale, WiFi, Analog Television, Digital Television, wireless, peer to peer, cable, combinations of the same, or the like. The stream scanner module 310 can also capture individual broadcast streams such as the selection of songs, ads and/or audio from a music player and/or a selection of movies and/or video content from a digital video player. In one embodiment, the stream scanner module 310 can scan a podcast from a media device.

FIG. 3 further illustrates the stream analysis module 320, which is configured to analyze the broadcast stream 121 obtained by the scanner module through the network 180. In one embodiment, the stream analysis module 320 identifies each specific instance of media content and/or data stream transmitted using broadcast stream 121. The stream analysis module 320 can be configured to identify media content in the broadcast stream 121 even in instances where the identification information is not obtained from the source of transmission such as broadcast source 120. In one example, the stream analysis module 320 analyzes the broadcast stream 121 using information it receives from the alternate broadcast source 130 via the alternate broadcast stream 131. In another example, the stream analysis module 320 can identify media content transmitted in the broadcast stream 121 by conducting wave form analysis to identify the media stream. In one embodiment, as will be discussed further below, the stream analysis module 320 may obtain identifying information from the media storage database 340. In another embodiment, the stream analysis module 320 can obtain identifying information from a third party to identify the media content transmitted in the broadcast stream 121.

The stream analysis module 320 in FIG. 3 can identify media content transmitted in the broadcast stream 121 in many other ways. Humans can monitor the broadcast stream 121, making notations on media content as they are broadcasted in a broadcast stream. Alternately, the stream analysis module 320 can accomplish the same task without constant human intervention. In one embodiment, the stream analysis module 320 uses identifying information that is transmitted by the broadcast source 120 and/or is transmitted along broadcast stream 121 to analyze the broadcast stream 121. The stream analysis module 320, for example, can decode a subcarrier signal that is generated by the digital data encoder module 210 and/or integrated with the broadcast stream 121 to further analyze the broadcast stream 121. In one embodiment, media programming such as a song transmitted as part of the broadcast stream 121 from an FM analog or digital radio can contain data in an associated RDS/RBDS/Program Associated Data (PAD) data stream that identifies the song title, artist, album, language, other information related to the song, and/or relevant information necessary to identify an advertisement and/or the associated advertiser. Identifying methodologies can comprise: textual string acquisition from broadcast stream 121 with normalization of acquired text, acquisition of content identifiers via broadcast stream 121 from third party sources matched to a local content database, broadcaster media event identifiers contextually unique to their universe of operation, content identifiers, direct acquisition from broadcast source 120 and/or acquisition from broadcast source 120 from web properties, third party sources, schedules of broadcast stream 121, combinations of the same, or the like. After the broadcast stream 121 is captured by the broadcast scanner module, the stream analysis module 320 can retrieve data from the data stream, analyze the data in the data stream, and/or identify the associated broadcast stream.

In FIG. 3, the stream analysis module 320 can further analyze the broadcast stream for a digital fingerprint, and/or compare the digital fingerprint of the scanned media content and/or broadcast stream with the digital fingerprints already stored in the media storage database 340. If the fingerprint for the media content and/or the broadcast stream match information that is stored in media storage database 340, then the stream analysis module can assign the broadcast stream and/or media segment a unique event identifier, and/or store the unique event identifier with the matching information in the media storage database 340. In some embodiments, the broadcast scanning system 160 is also configured to send to broadcast receiving devices 140 the unique event identifier that corresponds and/or that is associated with the broadcast stream that is being received by the broadcast receiving devices 140.

For example, if the stream analysis module 320 in FIG. 3 identifies the song being broadcasted in the broadcast stream 121, then the stream analysis module 320 assigns a unique event identifier to each specific broadcast stream and/or media segment, and/or stores the unique event identifier as well as the artist/advertiser and/or title of the song/advertisement, the time, date, channel, content identifier, ISCI Code and/or station and/or other relevant data that the media was broadcasted. The broadcast scanning system 160 is then configured to broadcast the unique event identifier to the broadcast receiving devices 140 that are receiving the specific broadcast stream and/or media segment that corresponds to the unique event identifier. In one embodiment, the broadcast scanning system 160 can then provide broadcast receiving devices 140 access to the information that is stored in media storage database 340 through use of the unique event identifier. In another embodiment, the broadcast scanning system 160 can then provide broadcast receiving devices 140 access to the information that is stored in media storage database 340

With reference to FIG. 3, the stream analysis module 320 not only identifies songs but also identifies other media content comprising without limitation television programs, movies, advertisements, promotions, news, sporting events, weather, stock information, combinations of the same, or the like. In the event that the scanned broadcast stream 121 and/or 131 contains more information than the database already contains, the media storage database 340 can be updated with the relevant new information (for example, song title, artist, album, ad, advertiser, availability, language, cultural affinity, political affinity, background information, special offers, where to get more information, combinations of the same, or the like).

In FIG. 3, the broadcast scanning system 160 comprises the media storage database 340, which can be configured to store the results from the analysis performed by the stream analysis module 320. In one embodiment, the media storage database 340 indexes scanned broadcast streams with a unique event identifier and/or database pointer. The media storage database 340 can further store additional information that provides more detailed information about broadcast stream 121, and such information comprises without limitation; stream type, signal strength, broadcast clarity, time and/or date of each broadcast stream transmission, errors in the broadcast stream 121, frequency and/or channel identification, signal anomalies and/or signal fingerprints that are distinctly characteristic of a particular broadcast source 120, station identification, combinations of the same, or the like. In one embodiment, the media storage database 340 stores waveforms associated with the audio of the broadcast stream 121 such as a song, advertisement, radio and/or television program, and/or an introduction to media content along with relevant information associated with each media segment. In other embodiments, the stored information may be specific to a program and/or product/service but not to each instance of that program. In another embodiment, the media storage database 340 stores textual information gained from scanning the broadcast stream 121 and/or its associated data stream such as RBDS, RDS, Internet Protocol, General Packet Radio Service (GPRS), High-Speed Downlink Packet Access (HSDPA), IBOC data, combinations of the same, or the like. Each broadcast event such as a song and/or advertisement receives the assignment of a unique event identifier specific to the instance of broadcast of that media event and/or segment.

In embodiments of the invention, the media storage database 340 of FIG. 3 is accessible by broadcast receiving system 140. For example, if a user is listening to media content on a broadcast receiving system 140, and/or the user desires to obtain more information about the media content and/or engage in a purchase transaction, the user in some embodiments clicks a button on the broadcast receiving system 140. The broadcast receiving system 140 sends the unique event identifier that is associated with the media content to the broadcast scanning system 160. The broadcast scanning system 160 performs a database lookup and/or search of the unique event identifier in the media storage database 340 to obtain information related to the media content.

In one embodiment, the broadcast receiving device 140 is configured to allow users to conduct searches of the media storage database 340 using imperfect human recollection. For example, if a user recalls a portion of a station name, an artist name, a program title, an estimated broadcast time of media stream, combinations of the same, or the like, then the user may use the broadcast receiving device 140 to perform a database search of the media storage database 340 by sending to the broadcast scanning system 160 a query and/or search request that comprises the partially recalled information about a broadcast stream. The broadcast scanning system 160 is then configured to perform a database search of the media storage database 340 based on the partially recalled information.

Additionally, if users of broadcast receiving systems 140 know the particular media content they desire to access, for example, a particular advertisement, then users may send a request to the broadcast scanning system 160. The broadcast scanning system 160 is then configured to perform a database search of the media storage database 340 based on the media content name provided. In some embodiments, the broadcast scanning system 160 is configured to return to the broadcast receiving device every instance (for example, time, date, source of transmission, and/or geographic location) of a specific media content and/or the surrounding context (for example, media content that occurred before, during or after the targeted media content on the same or other monitored media streams) to users of the broadcast receiving devices 140. In one embodiment, the broadcast scanning system 160 is configured to provide and/or generate a report for third party entities, wherein the report summarizes the requests submitted by users of the broadcast receiving devices 140. Such reports are useful to third parties, such as advertisers, record companies, broadcasters, analytical companies, combinations of the same, or the like to determine user interest in broadcast media content, time of day impact, gender impact, age impact, race impact, political, cultural, ethnicity impact, combinations of the same, or the like. Additional methods and systems of how the data mining and reporting system operates is disclosed in detail in U.S. patent application Ser. No. 10/806,084, filed Mar. 22, 2004, titled "BROADCAST RESPOND METHOD AND SYSTEM," which is incorporated by reference in its entirety. Additional methods and system of how users of the broadcast receiving devices 140 respond to broadcasts are disclosed in detail in U.S. Pat. No. 6,957,041, which issued on Oct. 18, 2005, which is incorporated by reference in its entirety.

As illustrated in FIG. 3, the broadcast scanning system 160 comprises the device monitoring module 330, which communicates with broadcast receiving devices 140. The device monitoring module 330 for example obtains user device status from broadcast receiving devices 140 (for example, whether the device is on or off, whether a station change has occurred, what is the media content currently being played, whether a radio or a media player is on, user responses, combinations of the same, or the like). The device monitoring module 330 can also track the types of broadcast streams that are being received by the broadcast receiving devices 140. In one embodiment, the stream scanner module 310 scans the broadcast stream 121, the stream analysis module 320 analyzes the media content of the broadcast stream 121, and/or assigns and/or stores a unique event identifier or other identifier, such as a broadcaster media event identifier, associated with the broadcast stream 121 for that broadcast event and/or media segment. If the device monitoring module 330 detects that the broadcast receiving device 140 is receiving the broadcast stream 121, then the device monitoring module 330 sends and/or transmits the unique event identifier to broadcast receiving device 140.

In FIG. 3, the device monitoring module 330 of the broadcast scanning system 160 can obtain, in addition to generating status reports, other types of information from the broadcast receiving devices 140. For example, the device monitoring module 330 can receive information when a user of a broadcast receiving device 140 submits a vote about a media content event transmitted in broadcast stream 121. In one embodiment, the device monitoring module 330 receives data and/or information from broadcast receiving system 140 about purchases, votes, expressions of interest and/or other actions made by users on the broadcast receiving devices 140. The methods and systems of how users of the broadcast receiving devices 140 interactively respond to broadcasts are disclosed in detail in U.S. patent application Ser. No. 10/806, 084, filed Mar. 22, 2004, titled "BROADCAST RESPOND METHOD AND SYSTEM," which is incorporated by reference in its entirety. Additional methods and system of how users of the broadcast receiving devices 140 respond to broadcasts are disclosed in detail in U.S. Pat. No. 6,957,041, which issued on Oct. 18, 2005.

The device monitoring module 330 of FIG. 3 can obtain additional information from the broadcast receiving devices 140, such as whether users of the broadcast receiving devices 140 forwarded the media programming and/or information about the media programming received in the broadcast stream 121 to a third party, whether users marked the media content for further review, voted, bought ringtones, CD's digital music, videos, wallpapers, responded to an ad and/or television program, combinations of the same, or the like. The device monitoring system is configured to capture additional status information such as demographic information associated with users of the broadcast receiving devices 140; information associated with broadcast receiving devices 140 (for example, product or device registration, location of the broadcast receiving devices 140); quality of the media received in the broadcast stream 121; language of the broadcast stream 121, other activities that users of the broadcast receiving device 140 are conducting; time stamps related to reception of the broadcast stream 121; time stamps of user responses to media programming received using each broadcast stream; interactions with other devices; type and/or number of broadcast streams accessed by the broadcast receiving devices 140; combinations of the same, or the like.

The device monitoring module 330 of FIG. 3, in addition to obtaining information from broadcast receiving devices 140, transmits information to the broadcast receiving devices 140. For example, the device monitoring module 330 broadcasts a unique data stream using scanning broadcast stream 161 to broadcast receiving devices 140 that simultaneously receive the broadcast stream 121 from the broadcast source 120. In some embodiments, the unique data stream comprises a unique event identifier associated or assigned to the broadcast stream 121.

The device monitoring module 330 can be configured to store in the media storage database 340 any device communication 141 information that the device monitoring module 330 receives from the broadcast receiving devices 140. Therefore, the media storage database 340 can store broadcast receiving device user statistics and/or response data along with the media content that device monitoring module 330 receives from broadcast receiving devices 140 and/or the various data sources 120.

In one embodiment, the media storage database 340 is proprietary. In some embodiments, the media storage database 340 is managed by a third party. In one embodiment, the media storage database 340 contains both proprietary and third party elements. In certain embodiments, the media storage database 340 is accessed through the internet. In one embodiment, there is a plurality of broadcast scanning systems 160. In some embodiments, the number of broadcast scanning systems 160 is the same as the number of broadcast sources 120. In one embodiment, the number of broadcast scanning systems 160 is fewer than the number of broadcast sources 120. In certain embodiments, the broadcast scanning system 160 receives both the broadcast source 120 and the alternate broadcast source 130 associated with broadcast source 120. In one embodiment, one broadcast scanning system 160 receives a media stream from the broadcast source 120 and a different broadcast scanning system 160 receives the alternate broadcast source 130 associated with broadcast source 120. In some embodiments, a broadcast scanning system 160 communicates with other broadcast scanning systems 160. In one embodiment, each broadcast scanning system 160 operates independently from other broadcast scanning systems 160. In certain embodiments, the number of broadcast scanning systems 160 is the same as the number of broadcast receiving devices 140. In some embodiments, the number of broadcast scanning systems 160 is less than the number of broadcast receiving devices 140. In one embodiment, code resident in the broadcast receiving device 140 determines which broadcast scanning system 160 the broadcast receiving device 140 will communicate with. In certain embodiments, the determination of which broadcast scanning system 160 the broadcast receiver device 140 will communicate with is contained in a database of broadcast scanning systems 160 resident in broadcast receiving device 140. In one embodiment, the determination of which broadcast scanning system 160 the broadcast receiver device 140 will communicate with is made by polling multiple broadcast scanning systems 160. In some embodiments, the broadcast receiving device 140 communicates with a server system to determine which broadcast scanning system 160 is the best source for obtaining data. In one embodiment, a server system determines which broadcast source 120 a broadcast scanning system 160 will receive based on communication with broadcast receiving devices 140. In certain embodiments, the server system uses a database of broadcast scanning systems 160 to determine which broadcast scanning system 160 a particular broadcast receiving device 140 should communicate with. In one embodiment, the broadcast receiving device 140 communicates changes in broadcast receiver device status to the broadcast scanning system 160 such as turning on, turning off, and/or changing reception from one broadcast source 120 to another broadcast source 120. In some embodiments, all broadcast receiving devices 140 receiving the same broadcast source 120 communicate with a single broadcast scanning system 160. In one embodiment, broadcast receiving devices 140 receiving the same broadcast source 120 communicate with different broadcast scanning systems 160. In certain embodiments, some broadcast receiving devices 140 receiving the same broadcast source 120 communicate with one broadcast scanning system 160 while other broadcast receiving devices 140 communicate with a different broadcast scanning system 160. In one embodiment, broadcast scanning system 160 prepares a list of broadcast sources 120 available to broadcast receiving devices 140. The list of available broadcast sources 120 can be filtered based on criteria pertinent to the broadcast receiving device 140. The filtering can be made based on a selection by the user of broadcast receiving device 140, based on pre-selected criteria and/or based on the broadcast scanning system 160 obtaining the status of the broadcast receiving device 140. In another embodiment, the broadcast receiving device 140 reports its geographic location to the broadcast scanning system 160 and/or the broadcast scanning system 160 filters the list based on availability of reception of broadcast sources 120 by the specific broadcast receiving device 140 requesting the list. In certain embodiments, the list is filtered by preferred media format. In one embodiment, the broadcast receiving device 140 presents a list of broadcast sources 120 available to the broadcast receiving device 140. The presentation of the list can be on demand by the user, when the broadcast receiving device 140 is activated, upon a status change of available broadcast sources 120, upon a status change on the part of the broadcast receiving device 140, periodically and/or based on other criteria. The status change can comprise geographic movement, time of day, changes in communication availability, loss of service, restoration of service, changes in filter criteria and/or other status alterations. The last broadcast source 120 accessed can be selected as the default source. Preferential positioning within the list of available broadcast sources 120 can be made. A formula can be used to predict what broadcast sources 120 would be preferred by the broadcast receiving device 140 user with the formula determining at least part of the list filtering and/or the list presentation manner including as displayed to the user. In another embodiment, usage patterns could determine the presentation list of available broadcast sources 120 using criteria such as: time of day receiving device 140 is powered up, and/or time of day a media segment is received by broadcast receiving device 140 where presenting a list of available broadcast sources 120 is based on previous usage patterns established by the user of broadcast receiving device 140.

Figure 3A:
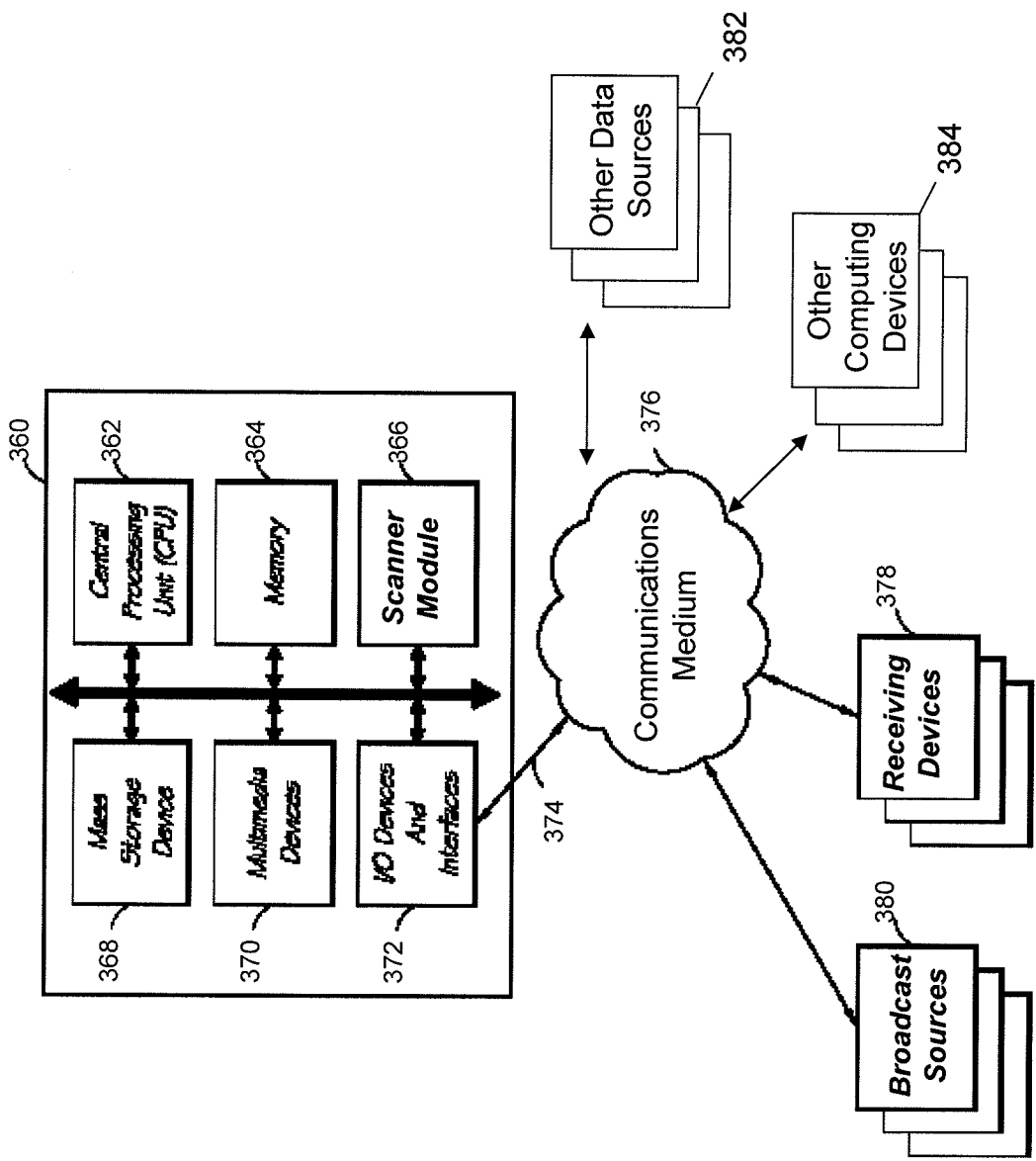
FIG. 3A illustrates a block diagram depicting one embodiment of a computer system configured to run software for implementing one or more embodiments of the broadcast scanning system.

FIG. 3A illustrates a block diagram depicting one embodiment of a computer system configured to run software for implementing one or more embodiments of the broadcast scanning system described herein.

Computing System

FIG. 3A is a block diagram of one embodiment of a computing system 360 that is in communication with one or more broadcast sources 380, one or more receiving devices 378, one or more other databases and/or data sources 382, and/or one or more other computing devices 384 via one or more networks 376. The computing system 360 may be used to implement one or more of the systems and methods described herein. In addition, in one embodiment, the computing system 360 may be configured to create and/or apply scanner modules 366 that generate and/or manage a repository of broadcast scanning data, comprising, for example, identifying broadcast content, obtaining information associated with the broadcast content, assigning unique event identifiers to a specific broadcast of a broadcast stream and/or media segment, and/or maintaining a database of unique event identifiers. In other embodiments, the computing system 360 is configured to execute searching and/or matching algorithms for identifying broadcast content and/or information used to provide a precise response to user inquiries and/or requests wherein a unique event identifier is returned with the inquiry and/or request. The returned unique event identifier can then be correlated with at least one stored entry in computing system 360. While FIG. 3A illustrates one embodiment of a computing system 360, it is recognized that the functionality provided for in the components and/or modules of computing system 360 may be combined into fewer components and/or modules and/or further separated into additional components and/or modules.

Scanner Module

With reference to FIG. 3A, in one embodiment, the system 360 comprises a scanner module 366 that carries out the functions described herein with reference to the broadcasting scanning system 160. The scanner module 366 may be executed on the computing system 360 by a central processing unit 362 discussed further below.

Computing System Components

Regarding FIG. 3A, the computing system 360 can also comprise a personal computer, workstation, server, and/or mainframe computer suitable for controlling and/or communicating with large databases, performing high volume transaction processing, and/or generating reports from large databases. The computing system 360 also comprises a central processing unit (CPU) 362, which may comprise a conventional microprocessor and/or baseband chip. The computing system 360 further comprises a memory 364, such as random access memory (RAM) for temporary storage of information and/or a read only memory (ROM) for permanent storage of information, and/or a mass storage device 368, such as a hard drive, diskette, flash memory and/or optical media storage device. Typically, the modules of the computing system 360 are connected to the computer using a standards based bus system. In different embodiments, the standards based bus system could be Peripheral Component Interconnect (PCI), Microchannel, Small Computer System Interface (SCSI), Industrial Standard Architecture (ISA), Baseband Bus and Extended ISA (EISA) architectures, combinations of the same, or the like.

As illustrated in FIG. 3A, an embodiment of a computing system 360 configured to run software for implementing one or more embodiments of the broadcast scanning system comprises one or more commonly available input/output (I/O) devices and/or interfaces 372, such as a keyboard, mouse, touchpad, four-way navigation system, other sensors, wireless technologies such as Bluetooth, WiFi, Infrared and/or printer. In one embodiment, the I/O devices and/or interfaces 372 comprise one or more display devices, such as a monitor, that allows the visual presentation of data to a user. More particularly, a display device provides for the presentation of GUIs, application software data, list of scanned media streams and/or their source, multimedia presentations, transmitted or received media, for example. In the embodiment of FIG. 2, the I/O devices and/or interfaces 372 also provide a communications interface to various external devices. The computing system 360 may also comprise one or more multimedia devices 370, such as speakers, video cards, graphics accelerators, vibrators, and/or microphones, for example.

Computing System Device/Operating System

The computing system 360 may run on a variety of computing devices, such as, for example, a server, a Windows server, an Apple Computer server, a Structure Query Language server, a Unix server, a personal computer, a mainframe computer, a laptop computer, a cell phone, a personal digital assistant, a kiosk, an audio player, combinations of the same, or the like. The computing system 360 is generally controlled and/or coordinated by operating system software, such as z/OS, Windows 95, Windows 98, Windows NT, Windows 2000, Windows XP, Windows Vista, Linux, SunOS, Solaris, Palm, Windows Mobile, Symbian, Blackberry, and/or other compatible operating systems. In Macintosh systems, the operating system may be any available operating system, such as MAC OS X. In other embodiments, the computing system 360 may be controlled by a proprietary operating system. Conventional operating systems control and/or schedule computer processes for execution, perform memory management, provide file system, networking, and/or I/O services, and/or provide a user interface, such as a graphical user interface (GUI), among other things.

Network

In the embodiment of FIG. 3A, the computing system 360 communicates with a network 376, such as one or more of a LAN, WAN, cellular network, public switched telephone network and/or the internet, for example, via a wired, wireless, or combination of wired and wireless, communication link 374. The network 376 communicates with various computing devices and/or other electronic devices via wired and/or wireless communication links. In the embodiment of FIG. 3A, the network 376 is communicating with one or more broadcast sources 380 and/or one or more receiving devices 378.

Access to the scanner module 366 of the computer system 360 by broadcast sources 380 and/or by receiving devices 378 may be through a web-enabled user access point such as the broadcast sources 380 and/or receiving devices 378 personal computer, cellular phone, digital media player, laptop, and/or other device capable of connecting to the internet 376. Such a device may have a browser module implemented as a module that uses text, graphics, audio, video, and/or other media to present data and/or to allow interaction with data via the network 376. The browser module may be implemented as a combination of an all points addressable display such as a cathode-ray tube (CRT), a liquid crystal display (LCD), a plasma display, and/or other types and/or combinations of displays. In addition, the browser module may be implemented to communicate with input devices 372 and/or may also comprise software with the appropriate interfaces which allow a user to access data through the use of stylized screen elements such as, for example, menus, windows, dialog boxes, bar coding, selectable lists, toolbars, and/or controls (for example, radio buttons, check boxes, sliding scales, combinations of the same, or the like). Furthermore, the browser module may communicate with a set of input and/or output devices to receive signals from the user. The input device(s) may comprise a keyboard, roller ball, four way navigation system, pen and/or stylus, mouse, trackball, voice recognition system, and/or pre-designated switches and/or buttons. The output device(s) may comprise a speaker, a display screen, a printer, and/or a voice synthesizer. In addition a touch screen may act as a hybrid input/output device. In another embodiment, a user may interact with the system more directly such as through a system terminal connected to the score generator without communications over the internet, a WAN, LAN, and/or similar network.

In some embodiments, the system 360 may comprise a physical and/or logical connection established between a remote microprocessor and a host computer for the express purpose of uploading, downloading, and/or viewing interactive data and/or databases on-line in real time. In some embodiments, broadcast sources 380 are internal to a device, and/or the computer system 360 may internally access the broadcast source 380 with the scanner 366 as an application and/or process run by the CPU 362.

Other Systems

In addition to the systems that are illustrated in FIG. 3A, the network 376 may communicate with other broadcast sources 380, other receiving devices 378, other data sources 382 and/or other computing devices 384. The computing system 360 may also comprise one or more internal and/or external data sources. For example any of the repository of media content identification data, unique event identification data, and/or other components of the broadcast scanning system 160 described herein may be stored in whole or in part in the computing system 360 and/or may be stored in whole or in part on another system. In some embodiments, one or more of the data repositories and/or the data sources may be implemented using a relational database, such as DB2, Sybase, Oracle, CodeBase and/or Microsoft® SQL Server, mySQL, PHP as well as other types of databases such as, for example, a flat file database, an entity-relationship database, an object-oriented database, and/or a record-based database.

Figure 4:
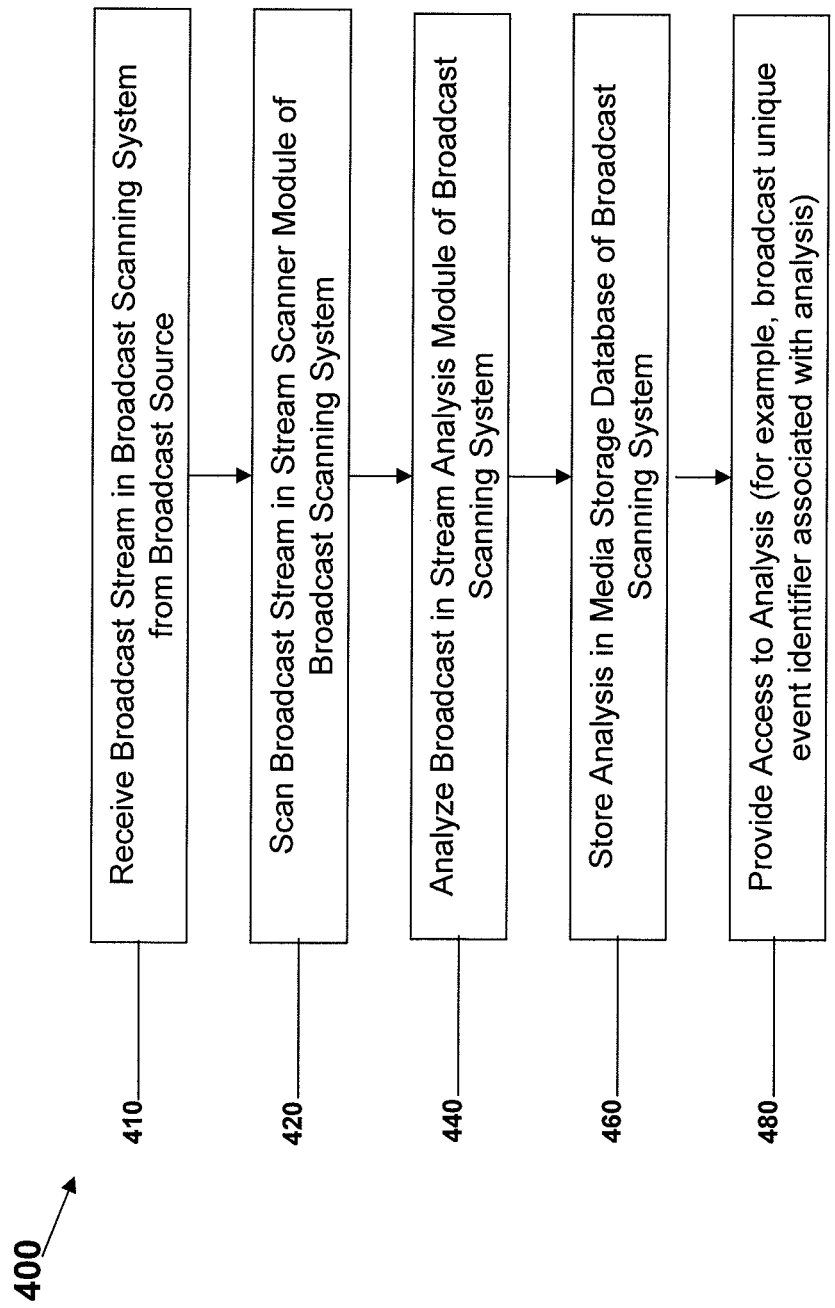
FIG. 4 illustrates a flow-chart diagram of one embodiment of a method of scanning broadcast streams.

FIG. 4 illustrates a flow diagram of one embodiment of a method for capturing broadcast streams 121, analyzing the broadcast streams 121 to obtain information about the media content transmitted in the broadcast stream 121, obtaining more information about the media content if available, storing in the database the information related to the media content and/or media segment. In some embodiments, the method further comprises providing access to the stored information to broadcast receiving devices 140 and/or other third party entities.

As illustrated in FIG. 4, the scanning process 400 begins with block 410 whereby a broadcast stream 121 is received by broadcast scanning system 160, for example, from the broadcast source 120. The broadcast source 120 can be a television and/or radio station, an internet server and/or computer, peer-to-peer device, a media player, any other system and/or device that is capable of transmitting a data and/or media signal, combinations of the same, or the like.

Referring to block 420 in FIG. 4, the broadcast scanning system 160 scans a broadcast stream 121 broadcasted by, for example, the broadcast source 120 and/or the alternate broadcast source 130. As previously discussed, the broadcast scanning system 160 can be configured to scan several types of broadcast streams 121 comprising, but not limited to, radio, television, internet, Wi-Fi, peer-to-peer signals, combinations of the same, or the like. In one embodiment, the broadcast scanning system 160 uses the stream scanner module 310 of FIG. 3 to scan broadcast streams.

In block 440 of FIG. 4, the broadcast signal that is received by the broadcast source 120 in block 410 and scanned by the broadcast scanning system 160 in block 420 is analyzed. In one embodiment, the broadcast stream 121 is analyzed by the stream analysis module 320 of the broadcast scanning system 160 as illustrated in FIG. 3. Analyzing broadcast streams can comprise identifying media content and/or media programming segments transmitted in the broadcast stream 121 of FIG. 1. The broadcast scanning system 160 can identify media content transmitted in the broadcast stream 121 using various methods: obtaining a digital fingerprint of the broadcast stream 121, conducting a matching analysis of the digital fingerprint of the broadcast stream 121 with digital fingerprints stored in the media storage database 340; using non-automated mechanisms such as manual identification of programming events; obtaining identifying information from different sources than the original broadcast stream such as the internet and/or alternate broadcast source 121; decoding subcarrier data such as textually identifying information that is encoded and/or transmitted by the broadcast source 120 along the original broadcast stream 121; combinations of the same, or the like.

In block 460 of FIG. 4, the broadcast scanning system 160 is configured to store in the media storage database 340 the results of the scanning analysis of block 330. The broadcast scanning system 160 stores the results of the analysis for various reasons. In one embodiment, the broadcast scanning system 160 retrieves the digital fingerprint of the broadcast stream 121 from the database for identification purposes. The stream analysis module 320 may retrieve the stored data from the media storage database 340 to compare the stored digital fingerprint with the digital fingerprint of broadcasts received in the future to determine whether the stored data and/or media is identical to, similar to, and/or associated with the broadcast stream that being broadcasted. In other embodiments, the stored information is retrieved by the users of the broadcast receiving devices 140 through a database search, as will be further discussed. The broadcast scanning system 160 can also be configured to combine the broadcast stream 121 with information that is retrieved from the media storage database 340, and/or transmit the combined data to the broadcast receiving systems 140, thereby providing more pertinent information about the original broadcast stream to users of the broadcast receiving systems 140.

In block 480 of FIG. 4, the broadcast scanning system 160 provides access to information related to the broadcast stream 121. In one embodiment, the broadcast scanning system 160 transmits the scanned and/or analyzed information to the broadcast receiving devices 140 in accordance with preferences set by the users of the broadcast receiving devices 140. If users of the broadcast receiving devices 140 receive media content and/or media programming in the broadcast stream 121, but not any associated data stream that may contain information that is relevant to the broadcast stream 121, then the broadcast scanning system 160 can transmit to the broadcast receiving device 140 all or a portion of the data stored in the media storage database during block 460. For example, if the broadcast receiving device 140 users receive the FM signal without a RDS/RBDS data stream, and/or the RDS/RBDS data stream is too weak to process, then the device monitoring module 330 will detect the absence of an RDS/RBDS data stream. The device monitoring module 330 is then configured to signal the broadcast scanning system 160 to retrieve from the media storage database 340 all or a portion of the data related to the media content that is being broadcasted in the broadcast stream 121, and/or transmit that data to the broadcast receiving device 140.

With reference to FIG. 4, in one embodiment, the broadcast scanning system 160 provides access to the broadcast receiving device 140 using a wireless IP connection, such as GPRS and/or 3G. The broadcast scanning system 160 can also transmit supplemental, complimentary, and/or confirming data to the broadcast receiving devices 140 before, during and/or after the broadcast receiving devices 140 receive the original broadcast stream. For example, the broadcast scanning system 160 in block 480 transmits the information to the broadcast receiving devices 140 through a data stream while the broadcast receiving devices 140 receive a broadcast stream 121 from a discrete source. In other examples, users of the broadcast receiving devices 140 receive an RDS sub-carrier that is well suited for receiving textual information but is not well suited for sending graphical data and/or information. If the broadcast receiving devices 140 are capable of receiving both RDS, 3G and/or similar data streams, the broadcast scanning system 160 can transmit complimentary RDS and/or 3G data streams concurrently to the broadcast receiving devices 140 to be associated with the broadcast stream 121. If the broadcast receiving devices 140 are capable of receiving both RDS, 3G and/or similar data streams, the broadcast scanning system 160 can transmit complimentary RDS to the broadcast receiving devices 140 while 3G data streams could be received concurrently from broadcast source 120 to be associated with the broadcast stream 121 received by broadcast receiving devices 140. The broadcast scanning system 160 can transmit other data and/or information streams related to the broadcast stream 121.

Figure 5:
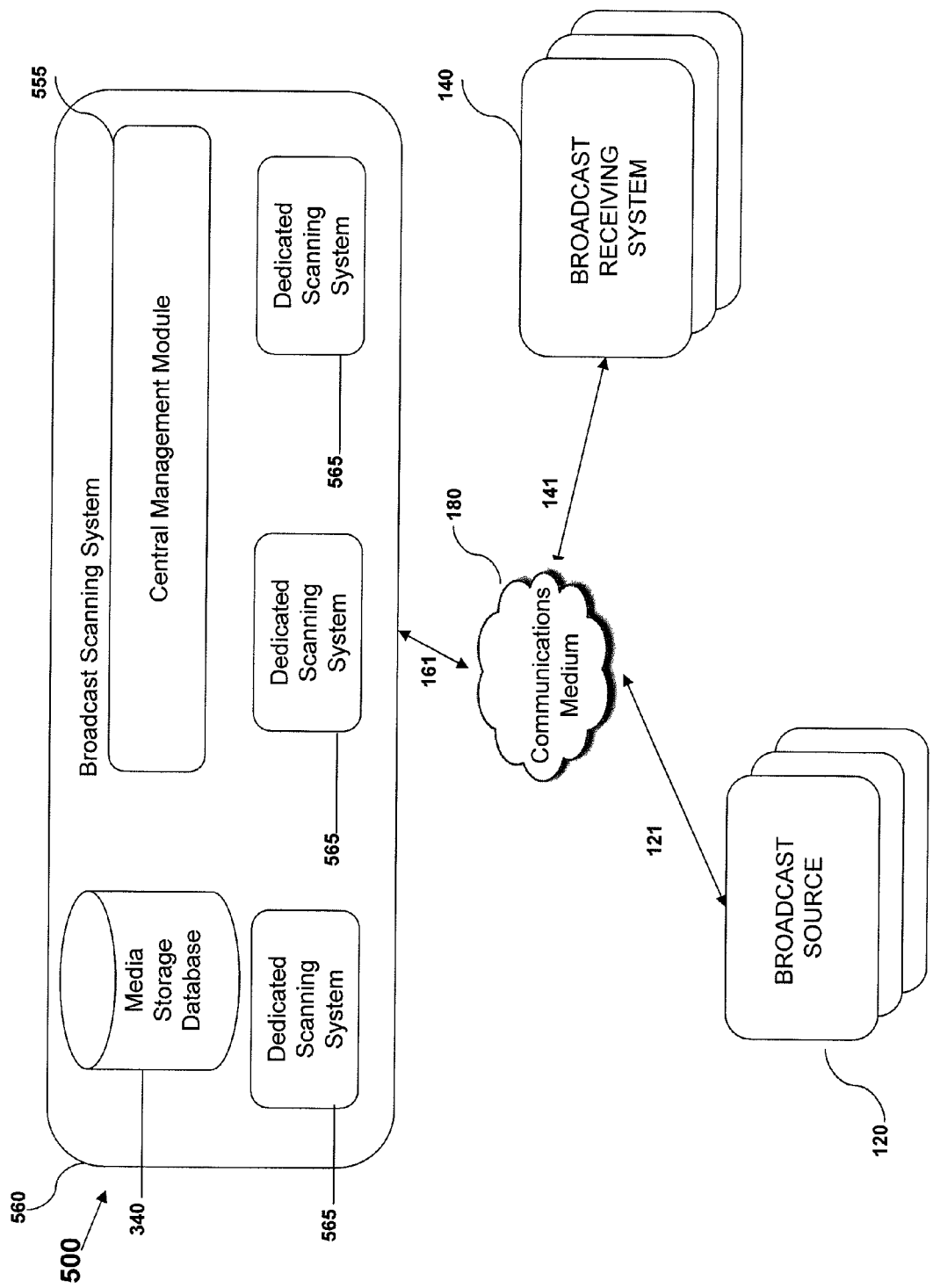
FIG. 5 illustrates one embodiment of a broadcast system wherein the broadcast scanning system comprises a centralized broadcast scanning system.
Figure 6:
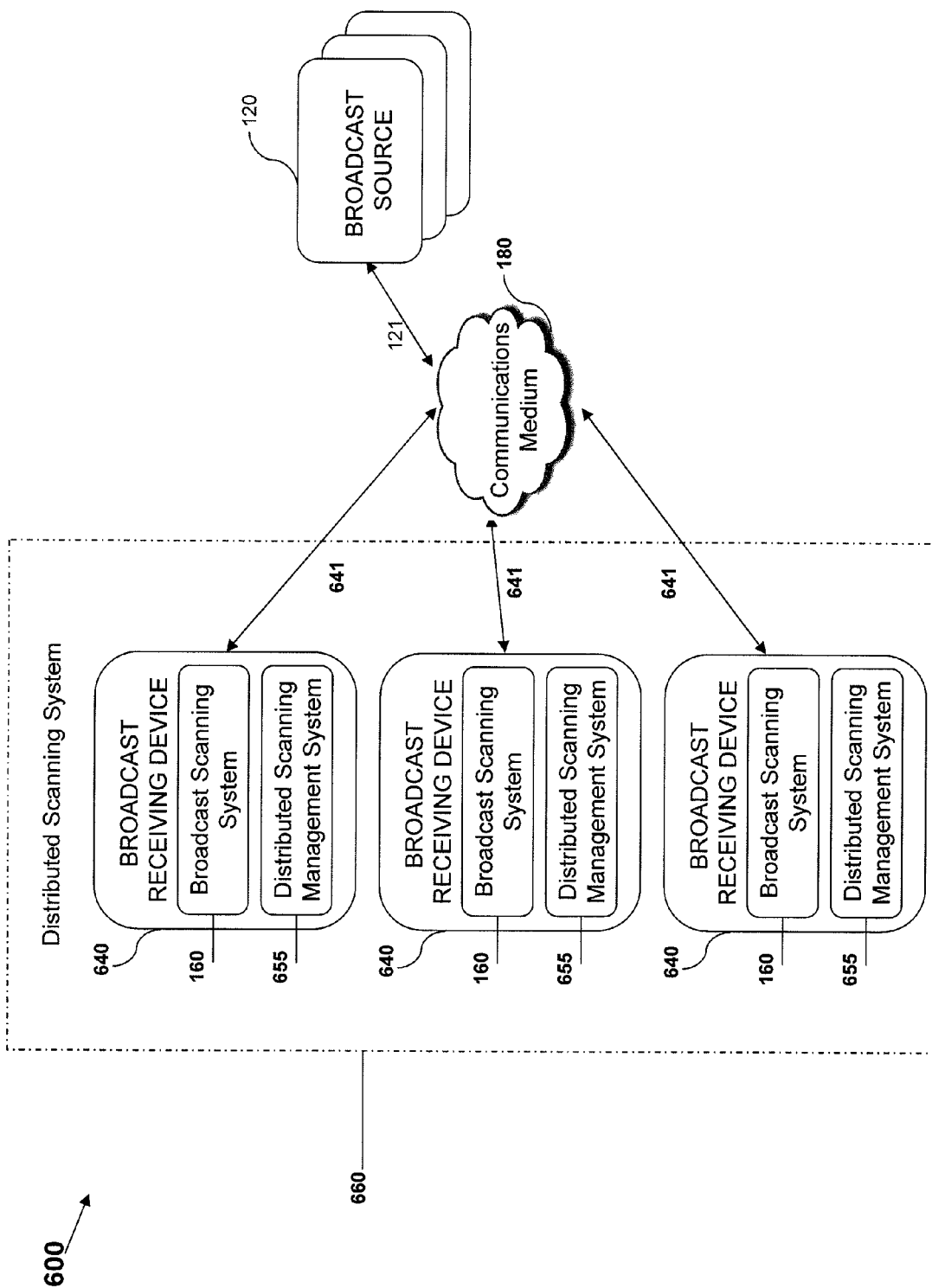
FIG. 6 illustrates a block diagram of one embodiment of a broadcast system wherein the broadcast scanning system comprises a distributed broadcast scanning system.
Figure 7:
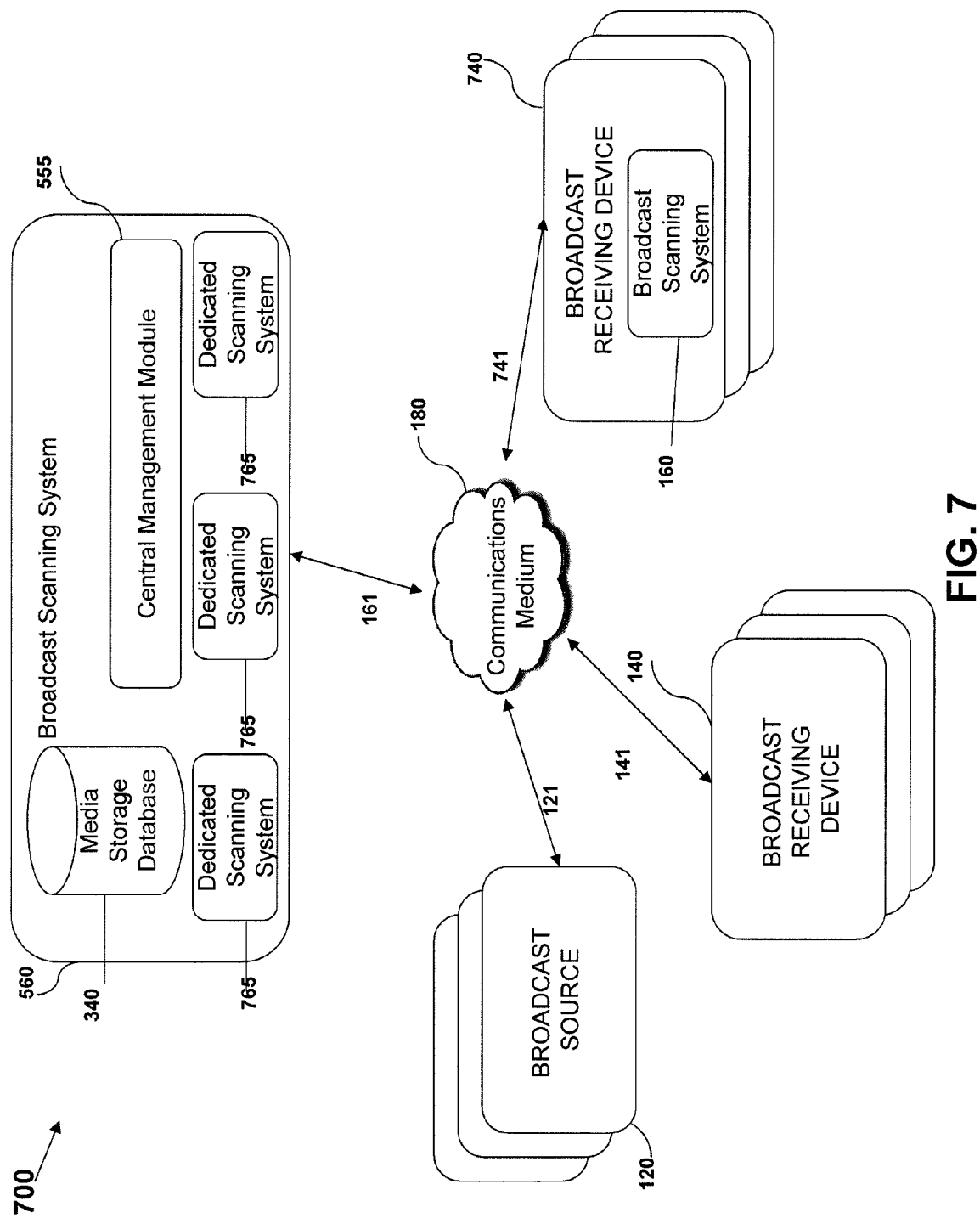
FIG. 7 illustrates a block diagram of one embodiment of a broadcast system wherein a broadcast scanning system comprises a centralized scanning system combined with a distributed broadcast scanning system.

With reference to FIGS. 5, 6, and 7, the broadcast scanning system 160 as discussed herein can be configured in different forms. In some embodiments, the broadcast scanning system 160 can comprise dedicated scanning systems at fixed locations as illustrated in FIG. 5. In other embodiments, the broadcast scanning system can comprise a plurality of scanning systems, wherein the scanning systems are incorporated into a plurality of broadcast receiving devices 640 as illustrated in FIG. 6. In this embodiment, the scanning systems are said to be distributed because the broadcast receiving devices are distributed across a particular geographic area. In other embodiments, the broadcast scanning system can comprise both dedicated scanning systems and distributed scanning systems as illustrated in FIG. 7. Each of the foregoing embodiments is discussed below.

In one embodiment, as illustrated in FIG. 5, the broadcast system 500 comprises the broadcast source 120, the broadcast receiving devices 140, and the centralized scanning system 560. The centralized scanning system 560 further comprises the one or more dedicated scanning systems 565, and the central management module 555. In some embodiments, there is a dedicated scanning system 565 for each broadcast stream 121. In certain embodiments, there are fewer scanning systems 565 than broadcast streams 121 and dedicated scanning systems 565 scan more than one broadcast stream 121. In some embodiments, there are extra dedicated scanning systems 565 that can serve as backups. FIG. 5 depicts the centralized scanning system 560 wherein the dedicated scanning systems 565 scan the broadcast streams 121 from the broadcast sources 120 (for example, a radio station) and/or the broadcast receiving systems 140 (for example, a media player device). Each of the dedicated scanning systems 565 can be configured to perform the scanning analysis to identify the media content in the broadcast stream 121 transmitted from a specific broadcast source 120. In other embodiments, the dedicated scanning systems 565 can be configured to multiplex thereby allowing each dedicated scanning system 565 to perform the scanning analysis on a plurality of broadcast streams 121 from a plurality of broadcast sources 120. The communication means 180, and broadcast receiver link 141 could be the same or similar in function as illustrated in FIG. 1.

Referring to FIG. 5, the dedicated scanning systems 565 are then configured to send analysis reports about the scanned broadcast stream 121 to the central management module 555. The dedicated scanning systems 565 can be configured to send status reports on a real-time, constant, batch, periodic, delayed, and/or scheduled basis. In other embodiments, the dedicated scanning systems 565 can send reports on a dynamic basis, for example, when a change of status occurs.

The central management module 555 can aggregate results of the scanning analysis conducted by the dedicated scanning modules for further processing and analysis. In one embodiment, the central management module 555 stores the aggregated data in the media storage database 340 of FIG. 3. The central scanning system 160 can transmit the results of the scanning analysis to the broadcast receiving devices 140, for example, using the device monitoring module 330 of FIG. 3. In one embodiment, the centralized scanning system 560 and the broadcast receiving devices 140 are both accessing the same broadcast stream 121 from the broadcast sources 120, with the centralized scanning system 560 performing scanning analysis of the broadcast stream 121 and/or scanning analysis of an associated data stream and/or then transmitting a supplemental media stream and/or a supplemental data stream to the broadcast receiving devices 140 using scanning broadcast stream 161. In another embodiment, the central management module 555 can associate a plurality of broadcasting receiving devices 140 to be managed by the appropriate dedicated scanning systems 565 wherein the results of the dedicated scanning system analysis can be sent first to the broadcast receiving devices 140.

FIG. 6 illustrates one embodiment of a broadcast system that employs a distributed scanning system 660 to perform the scanning analysis. In the distributed scanning system 660, each broadcast receiving device 640 scans the broadcast stream 121 transmitted by the broadcast sources 120 using the internal broadcast scanning system 160 and/or analyzes the broadcast stream 121 independent of an external broadcast scanning system 160. In one embodiment, the broadcast receiving devices 640 scan a closed captioning data stream accompanying a television broadcast transmitted by the broadcast sources 120. The broadcast receiving devices 640 scan the broadcast stream 121 for key words, and/or obtain additional images from another broadcast source, for example, the Internet. The broadcast receiving devices 640 then display the television broadcast, as well as any associated images obtained from the internet to the user, for example, in a picture-in-picture format and/or as discrete images on a display and/or screen. Additionally, the broadcast receiving devices 640 scan multiple RDS/RBDS data streams accompanying various radio broadcasts transmitted by the broadcast sources 120. The broadcast receiving devices 640 scan the broadcast streams 121 for key words, and/or obtain additional images from another broadcast source, for example, the Internet. The device monitoring module 330 of the broadcast scanning system 160 sends the key words as well as any associated images obtained from the internet to the broadcast receiving devices 640 tuned to the corollary broadcast stream 121 for presentation to the user, for example, in a picture-in-picture format and/or as discrete images on a display and/or screen allowing the user additional information and/or choices relating to broadcast stream 121. Broadcast receiving devices 640 may be capable of receiving a first broadcast stream 121 and/or any corollary data acquired from the device monitoring module 330 while also scanning a discrete second broadcast stream 121 for analysis by 320. The broadcast receiving devices 640 can access the broadcast streams 121 in a variety of ways as described herein. For example, the broadcast scanning system 160 can access broadcast stream 121 as described in FIG. 1. In the distributed scanning system 660, the broadcast receiving devices 640 may send status reports to a distributed management module 655 for data mining. The distributed management system 655 may maintain a history of status reports such that if communication is established with a centralized management module 555, the status reports and/or any additional information from the distributed management system can be transferred to the central management module 555 for further analysis. The broadcast receiving device link 641 can be the same or similar in function to the broadcast receiver link 141 from FIG. 1, but it can also comprise additional communication capabilities to handle the data inputs and/or outputs associated with integrating the broadcast scanning system 160 and/or the distributed management module 655.

In one embodiment, the broadcast receiving devices 640 communicate actions they perform with a server system. In one embodiment, broadcast receiving device 640 communicates with other broadcast receiving devices 640. In another expression of the system, broadcast receiving device 640 communicates with other broadcast receiving devices 140. In one embodiment, each broadcast receiving device 640 operates independently. In one embodiment, broadcast receiving devices 640 utilize internal databases as part of their scanning broadcast source 120. In one embodiment, broadcast receiving devices 640 utilize databases external to broadcast receiving devices 640 as part of their scanning broadcast source 120. In one embodiment, broadcast receiving devices 640 utilize internal databases and/or databases external to broadcast receiving devices 640 as part of their scanning broadcast source 120.

FIG. 7 illustrates one embodiment of a broadcast system where a combination of both the centralized scanning system 560 of FIG. 5 and the distributed scanning system 660 of FIG. 6 are present. In FIG. 7, the broadcast receiving devices 740 may perform a partial scanning analysis on, for example, an accompanying data stream to the broadcast stream 121, using broadcast scanning system 160 or functional equivalent integrated into broadcast receiving devices 740 and/or may obtain additional data from the centralized scanning system 560 if the broadcast receiving devices 740 cannot successfully and/or completely perform the analysis of broadcast streams. For example, if the expected accompanying data stream is not available, then the broadcast receiving device 740 is configured to obtain the data from the centralized scanning system 560. In another scenario, the broadcast receiving devices 740 completely perform the scanning analysis, but still send the status report to the centralized scanning system 560, which can perform additional scanning analysis not initially conducted by the broadcast receiving devices 740. The centralized scanning system 560 may additionally conduct a confirming scanning analysis in order to monitor the accuracy of the distributed scanning system 660. The broadcast receiving device link 741 can be the same or similar to the broadcast receiver link 141 and/or the broadcast receiving devices link 641. Differences may also be expressed through the use of various data formats, methods and/or communication means 180 associated with the combination of centralized scanning systems 560 and/or distributed scanning systems 660 used in combination in a mixed scanning system 700.

Referring to FIG. 7, in other embodiments, a broadcast scanning system that utilizes both a centralized scanning system 560 and a distributed scanning system 660 can scan a larger geographical area as compared to using only a centralized scanning system 560 or only a distributed scanning system 660. For example, in certain embodiments, the centralized scanning system 560 can only scan a certain geographical area due to, for example, the fixed location of the centralized scanning system, the strength of the scanning capability, and/or the geographical terrain being scanned. In certain embodiments, a distributed scanning system can scan geographical areas and/or frequencies that a centralized scanning system cannot. Accordingly, the distributed scanning system supplements and/or extends the range of scanning of a centralized scanning system. In addition, a distributed scanning system resident in broadcast receiving device 740 could provide cost savings in comparison to a centralized scanning system 560.

In one embodiment, the broadcast receiving devices 740 communicate the actions they are performing with a server system. In one embodiment, broadcast receiving devices 740 communicate with the central management system 555. In one embodiment, broadcast receiving device 740 communicates with other broadcast receiving devices 740. In one embodiment, each broadcast receiving device 740 operates independently. In one embodiment, broadcast receiving device 740 communicates with broadcast scanning system 560. In one embodiment, broadcast receiving device 740 communicates with other broadcast receiving devices 740. In one embodiment, broadcast receiving devices 740 utilize internal databases as part of their scanning broadcast source 120. In one embodiment, broadcast receiving devices 740 utilize databases external to broadcast receiving devices 740 as part of their scanning broadcast source 120. In one embodiment, broadcast receiving devices 740 utilize internal databases and/or databases external to broadcast receiving devices 740 as part of their scanning broadcast source 120. In one embodiment, broadcast receiving devices 740 utilize as part of their scanning broadcast source 120 the same databases as broadcast scanning system 560. In one embodiment, broadcast receiving devices 740 utilize as part of their scanning broadcast source 120, different databases than those used by broadcast scanning system 560. In one embodiment, broadcast receiving devices 740 utilize as part of their scanning broadcast source 120 a mixture of the same databases used by broadcast scanning system 560 and/or discreet databases used by broadcast scanning system 560. In one embodiment, the broadcast scanning system 560 determines which media streams 121 dedicated scanning systems 765 should scan. Determination of which media steam 121 can be scanned by 765 is made based on determination of the broadcast sources 120 that broadcast receiving devices 140 and/or broadcast receiving devices 740 are receiving. In one embodiment, where broadcast receiving device 740 is scanning a media stream 121, and/or where a broadcast receiving device 140 receives the same media stream 121, the analysis results of the scan conducted by broadcast receiving device 740 can be provided to broadcast receiving device 140. In one embodiment, where a broadcast receiving device 740 is scanning a broadcast source 120, and/or where the broadcast receiving device 140 receives the same broadcast source 120, broadcast receiving device 140 could receive some of the analysis results from a broadcast receiving device 740 that is scanning broadcast source 120 and/or some of the analysis results from the broadcast scanning system 560. In one embodiment, a broadcast receiving device 740 will communicate its analysis results to broadcast scanning system 560. In one embodiment, the central management module 555 will determine which broadcast receiving device 740 receiving a particular broadcast source 120 will communicate its analysis results to broadcast scanning system 560 and the broadcast receiving devices 740 that will not communicate their analysis results to broadcast source 120. In one embodiment, the broadcast receiving device 740 selected to scan a particular broadcast source 120 will communicate its analysis results in combination with other broadcast receiving devices 140 and broadcast receiving devices 740 receiving the same broadcast source 120. If a broadcast receiving device 740 is selected to scan a particular broadcast source 120 and/or communicate its analysis results with other broadcast receiving devices 140 and/or broadcast receiving devices 740 receiving the same broadcast source 120, and/or where its reception of the particular broadcast source 120 is interrupted, the central management module 555 will select another discreet scanning system to scan the broadcast source 120. In one embodiment, the discreet scanning system selected to scan the broadcast source 120 will be in a receiving device 740. In another embodiment, the discreet scanning system selected to scan the broadcast source 120 will be in a dedicated scanning system 565.

Figure 8:
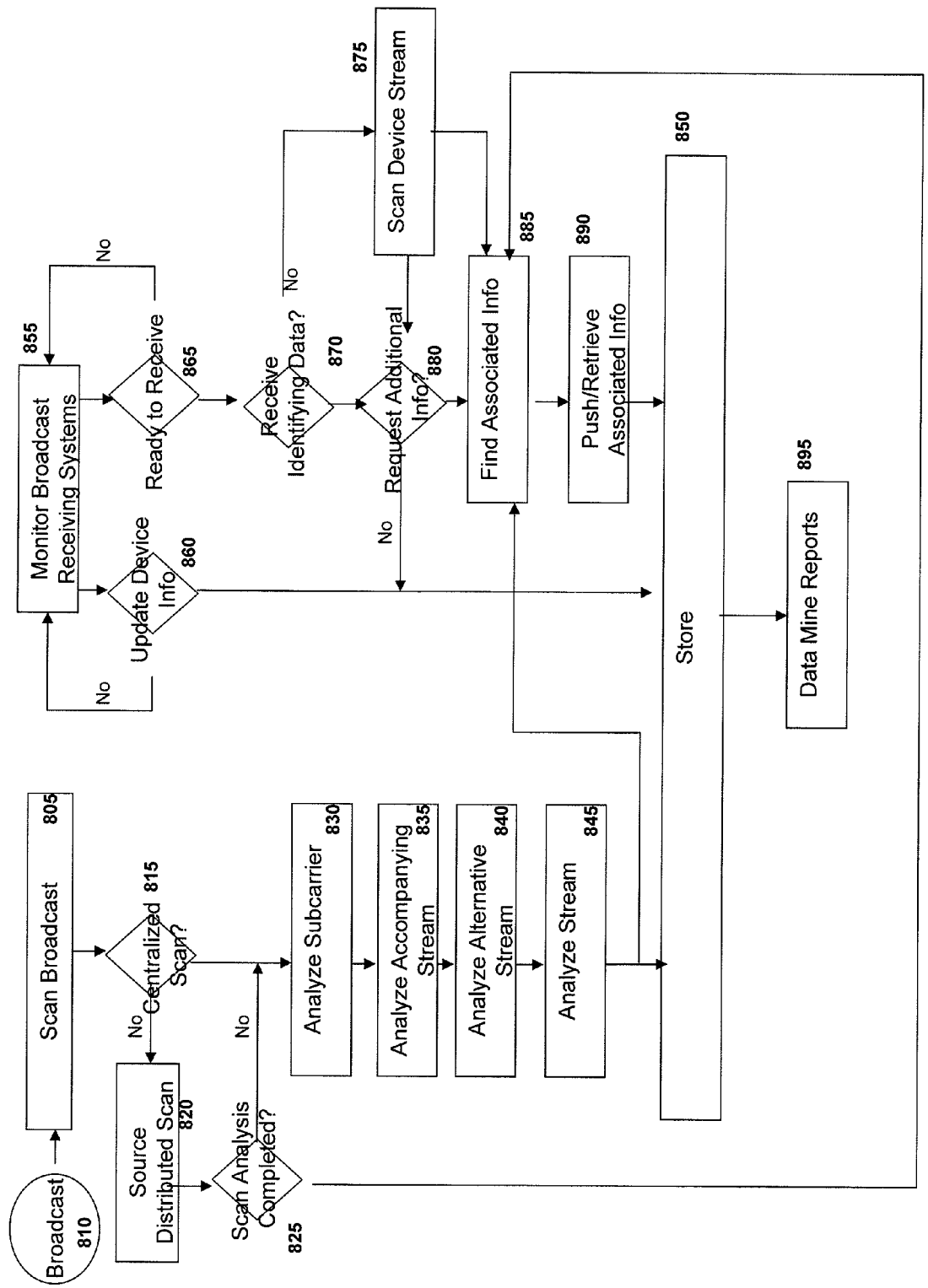
FIG. 8 illustrates a flow-chart diagram of one embodiment of a method of scanning, analyzing, storing broadcast streams and/or further communicating with broadcast receiving devices.

FIG. 8 illustrates a flow diagram of one embodiment of a method of scanning, capturing, and/or analyzing broadcast streams, and/or storing and/or providing access to the information derived from the analysis. FIG. 8 in addition depicts methods of monitoring the broadcast receiving devices 140, 640 and/or 740. In FIG. 8, the scanning process begins with block 805 whereby a broadcast is transmitted by a broadcaster, for example, the broadcast source 120 and/or the alternate broadcast source 130 and/or any other source capable of transmitting a broadcast signal, such as television and/or radio broadcasts, internet streams, Wi-Fi broadcasts, combinations of the same, or the like.

In block 810 of FIG. 8, the broadcast stream 121 that is transmitted by the broadcast source 120 is scanned by the broadcast scanning system 160. The broadcast scanning system 160 can scan the broadcast stream 121 using the centralized scanning system 560 illustrated in FIG. 5 and/or the distributed scanning system illustrated in FIG. 6 and/or a combination of the centralized scanning system 560 and the distributed scanning system illustrated in FIG. 7.

In block 815 of FIG. 8, the system determines whether the scanning was conducted by the centralized scanning system, the distributed scanning system or a combination of the two. If the broadcast stream 121 was captured with either the distributed scanning system or a mix of the distributed scanning system and the centralized scanning system, then the system in block 820 retrieves any information that was captured and/or analyzed by the broadcast receiving systems. Block 825 assesses whether the broadcast receiving devices 140, 640 and/or 740 completely analyzed the broadcast stream 121, and/or whether the retrieved data from block 820 is complete. The system subsequently stores the results of the analysis in block 850 and/or associates the analysis with the broadcast stream 121 in block 885 and/or provides the information to the broadcast receiving devices 140, as will be discussed further below.

If the broadcast stream 121 was scanned by the centralized scanning system 560 and/or if block 825 indicates that the results of the non-centralized scanning systems were incomplete, the broadcast scanning system 160 then analyzes the broadcast stream 121 in blocks 830-845. In block 830, the stream analysis module 320 of FIG. 3 determines if the broadcast source 120 encoded any subcarrier data (for example, RBDS, RDS, DARC, combinations of the same, or the like) along with the broadcast stream 121. In block 825, the broadcast stream 121 is analyzed for any other streams that may accompany the broadcast stream 121 (for example, simultaneous internet and/or radio broadcast streams of the same programming event transmitted by the broadcast source 120 using the alternate transmission module 230). The broadcast scanning system 160 then analyzes in block 840 whether the broadcast stream 121 has any alternative broadcast signals that are broadcast from different broadcast sources such as the alternate broadcast system 130. In block 845, the system analyzes the broadcast stream 121, for example, by comparing digital fingerprints of the broadcast stream 121 with digital fingerprints of media that is already stored in the media storage database 340. In another embodiment in block 845, the system analyzes the broadcast stream 121 and/or any textual and/or graphical data contained in a subcarrier and/or other accompanying data channel. In another embodiment in block 845, the system analyzes the broadcast stream 121 and/or any related textual and/or graphical data obtained from another source. The results and findings of 805-845 are stored in the media storage database 340 in block 850.

FIG. 8 further illustrates block 855 whereby the broadcast scanning system 160 monitors the broadcast receiving devices 140, 640 and/or 740 and/or obtains various types of information from the broadcast receiving devices 140, 640 and/or 740. In one embodiment, the broadcast scanning system 160 receives device broadcast streams 141 as illustrated in FIG. 3 using the device monitoring module 330. The device monitoring module 330 of the broadcast scanning system 160 can obtain user device status from broadcast receiving devices 140, 640 and/or 740 (for example, on, off, change of station, program associated data selections, user responses, combinations of the same, or the like). The broadcast scanning system 160 in addition can obtain preference settings from users of broadcast receiving devices 140, 640 and/or 740. In block 880, the broadcast scanning system 160 determines if users of the broadcast receiving devices 140, 640 and/or 740 are engaged in an activity, and/or stores a report of the activity in the media storage database 340 in block 850. In one embodiment, the broadcast scanning system 160 asks users of the broadcast receiving devices 140, 640 and/or 740 for confirmation before monitoring and/or storing any information related to the broadcast receiving devices 140, 640 and/or 740.

Block 860 of FIG. 8 also stores any user preference information related to the broadcast receiving devices 140, 640 and/or 740. Users of broadcast receiving devices can configure their devices to receive information from the broadcast scanning system 160 in various ways. For example, users of the broadcast receiving devices 140, 640 and/or 740 that receive radio media content from the broadcast stream 121 can opt to automatically receive complementary information about the radio media content, such as the name of the media content or segment, length of the segment, host and/or guest information, ads and/or products of a particular nature, songs of a particular nature and/or artist, combinations of the same, or the like. In one embodiment, users of broadcast receiving system 140, 640 and/or 740 that receive the broadcast stream 121 can choose to continuously receive from the broadcast scanning system 160 additional information that the broadcast scanning system 160 extracts from the broadcast stream 121. In another embodiment, users of broadcast receiving devices 140, 640 and/or 740 can choose to receive information from the broadcast scanning system 160 based on predetermined criteria. For example, users of broadcast receiving systems 140, 640 and/or 740 that receive broadcast stream 121 can choose to automatically receive data from alternate broadcast source 130 that is associated with broadcast stream 121 if the broadcast stream 121 is radio programming. The broadcast scanning system 160 then stores the user preference data and/or information, if there are any updates, in the media storage database 340 in block 850.

The broadcast scanning system 160 can also process responses to the broadcast from users of the broadcast receiving systems 140, 640 and/or 740, in block 860 of FIG. 8. For example, the analysis of the broadcast stream 121 performed by the broadcast scanning system 160 may indicate that the media content transmitted in the broadcast stream 121 is a song based on a digital finger print, but that the title and/or artist of the song are unknown. The broadcast scanning system 160 may then send data to the broadcast receiving system 140, 640 and/or 740 that presents the user with options, such as the ability to express an opinion about the song, conduct a search for additional information about the song, mark the song as a favorite, request identifying information about the artist and/or title of the song when it becomes available, and/or any other like user option.

The broadcast scanning system 160 can also be configured to process user responses received in the broadcast receiving system 140, 640 and/or 740 wherein such user responses relate to a particular broadcast stream. For example, a broadcast receiving device 140, 640 and/or 740 user may be interested in additional information that relates to a programming event transmitted using a broadcast stream, and/or such additional information may comprise but is not limited to concert information, product information, album, compilation, artist, title of a song, and/or an advertisement. The broadcast receiving device 140, 640 and/or 740 may transmit a response to the device monitoring module 330 of the broadcast scanning system 160 indicating interest. The methods and systems of processing broadcast responses are further described in detail in U.S. patent application Ser. No. 10/806,084, filed Mar. 22, 2004, titled "BROADCAST RESPOND METHOD AND SYSTEM," which is incorporated by reference in its entirety.

In block 865 of FIG. 8, the system monitors the broadcast receiving devices 140, 640 and/or 740 to determine whether users of the broadcast receiving devices 140, 640 and/or 740 are seeking more information about the broadcast stream 121 that they are receiving. If users of the broadcast receiving devices 140, 640 and/or 740 do not need to receive more information related to the broadcast stream 121 (for example, the broadcast receiving devices 140 are able to receive and/or decode subcarrier signals to identify the broadcast stream 121 themselves), the system continues to monitor the broadcast receiving devices 140, 640 and/or 740. In another example, the broadcast scanning system 160 can provide access to analyzed data in real time or delayed manner. If users of the broadcast receiving devices 140, 640 and/or 740 have a preference that they receive information from the broadcast scanning system 160 at a later time, the system in block 865 also continues to monitor the broadcast receiving devices 140, 640 and/or 740. In another example, block 865 checks preferences of users of the broadcast receiving devices 140, 640 and/or 740 to determine whether the system should continue monitoring the broadcast receiving devices 140, 640 and/or 740 or proceed to the next blocks in order to provide information to the broadcast receiving devices 140, 640 and/or 740.

With reference to FIG. 8, if the system determines in block 865 that users of the broadcast receiving devices 140, 640 and/or 740 are interested in receiving information that is associated with the broadcast stream 121 that they are already receiving, the broadcast scanning system 160 in block 870 determines whether the broadcast receiving devices 140, 640 and/or 740 have already received and/or processed identifying information (RBDS, RDS, DARC subcarrier in radio broadcast, closed caption information in television broadcast, combinations of the same, or the like) in the original broadcast stream 121. If users of the broadcast, receiving devices 140, 640 and/or 740 have already received and/or processed some identifying information from the broadcast stream 121, the users likely have already obtained at least minimal identification information that is related to the broadcast stream 121. Therefore, the broadcast receiving system 140 then enquires in block 880 whether users of the broadcast receiving devices 140, 640 and/or 740 are interested in receiving additional information from the broadcast scanning system 160.

If users of the broadcast receiving devices 140, 640 and/or 740 indicate that they are interested in receiving more information from the broadcast scanning system 160 in block 880, then broadcast scanning system 160 proceeds to find associated info 885. If block 870 indicates that users of the broadcast receiving devices 140, 640 and/or 740 do not have any identifying information that is related to the broadcast stream 121, the broadcast scanning system 160 proceeds to block 875 to rescan the broadcast stream 121. At block 875, the broadcast scanning system 160 then analyzes the broadcast stream 121 that is accessed by the broadcast receiving devices 140, 640 and/or 740 in order to determine whether the broadcast scanning system 160 has more information that is associated with the broadcast stream 121 scanned by the broadcast receiving devices 140, 640 and/or 740 to provide more information about the broadcast stream 121 to the broadcast receiving devices 140, 640 and/or 740. If block 875 finds identifying data, then broadcast scanning system 160 may proceed to block 880. If block 875 does not find identifying data, then broadcast scanning system 160 may proceed to block 885 where the results of the analysis of blocks 830 through 845 can be used to locate alternate data as an adjunct to broadcast stream 121. In other embodiments, the broadcast scanning system 160 accesses the device broadcast stream 161 in order to assess the types of broadcast streams accessed by the broadcast receiving devices 140, 640 and/or 740.

In block 885, the broadcast scanning system 160 analyzes the broadcast stream 121 that is accessed by the broadcast receiving devices 140, 640 and/or 740. In other embodiments, the broadcast scanning system 160 determines whether the media storage database 340 contains unique information that is related to the broadcast stream 121 accessed by the broadcast receiving devices 140, 640 and/or 740 and/or provides that information to the broadcast receiving devices 140 in block 890. In other embodiments, the broadcast receiving systems 140, 640 and/or 740 are configured to simultaneously receive a broadcast stream 121 and/or information related to the broadcast stream 121 from the broadcast scanning system 160, and therefore the broadcast scanning system 160 associates the results of block 825 and/or block 845 and/or provides the information to the broadcast receiving system in block 890 via block 885.

In block 890 of FIG. 8, the broadcast scanning system 160 provides to the broadcast receiving devices 140, 640 and/or 740 information that identifies the broadcast stream 121 that is being received by the broadcast receiving devices 140. In some situations, users of the broadcast receiving devices 140, 640 and/or 740 can opt to automatically receive information that is associated with the broadcast stream 121 and/or the broadcast scanning system 160 pushes the unique media stream to the broadcast receiving devices 140, 640 and/or 740. In other embodiments, users of the broadcast receiving devices 140, 640 and/or 740 opt to retrieve information that is related to the broadcast stream 121 at their own convenience. Various configurations are possible for providing users of the broadcast receiving devices 140, 640 and/or 740 access to information that is related to the broadcast stream 121 (for example, periodic reports, information provided to a particular demographic and/or geographic group, results of responses by a group of users, access via other mediums such as the internet instead of through the broadcast receiving devices 140, 640 and/or 740, combinations of the same, or the like). The broadcast scanning system 160 then stores any preference settings and/or matching of the device broadcast stream with any analyzed stream to the media storage database 340 in block 850.

FIG. 9 illustrates an example of the types of stream-related information that are stored in the media storage database 340. In some embodiments, the broadcast scanning system 160 stores several types of data related to the broadcast stream 121, such as the title of the media content or data segment transmitted in the broadcast stream 121, the source of the broadcast stream 121 (for example, the radio or television station, producer, network, frequency, internet server and/or IP address, combinations of the same, or the like), the transmission time of the broadcast stream, the media or data type (audio, text, video, combinations of the same, or the like) being broadcasted in the broadcast stream, language and/or any other data related to the broadcast stream. FIG. 9 illustrates an example of data and/or information that can be stored in the media storage database 340, and it will be recognized that other data and/or information can be maintained in the media storage database 340. The broadcast scanning system 160 can be configured with a user interface to facilitate manual searching of the database. In other embodiments, users of the broadcast receiving devices 140, 640 and/or 740 submit search requests based on human recollection using a search interface.

FIG. 10 illustrates examples of information that is related to the broadcast receiving devices 140, 640 and/or 740 that the media storage database 340 maintains. The broadcast scanning system 160 can be configured to store several types of data related to the broadcast receiving devices 140, 640 and/or 740, such as a registration information, a capacity to receive various broadcast streams (analog, digital, wireless, subcarrier, AM, FM, video, combinations of the same, or the like), and/or a status of the device (on, off, inoperable, location, last changed state, combinations of the same, or the like). In another embodiment, the media storage database 340 maintains preferences for users of the broadcast receiving devices 140, 640 and/or 740 (for example, display preference, operation preference, combinations of the same, or the like). In other embodiments, the media storage database 340 can store past activities performed by the users of the broadcast receiving devices 140, 640 and/or 740, for example, purchasing media content that was broadcasted over the broadcast stream, recommending media content and/or media programming to other users, responses to advertisements, content, voting, polling, subscriptions, pledge drive responses, combinations of the same, or the like.

With reference to FIG. 9 and FIG. 10, the broadcast scanning system 160 is configured in one embodiment to data mine the various types of information stored in the media storage database 340, and/or provide that information to various entities. For example, the broadcast scanning system 160 can retrieve the stored data in a report format to provide the information, based on preferences as set by users of the broadcast receiving devices 140, 640 and/or 740, to third party entities, such as marketing and/or research data processors. In one embodiment, access to and/or control of the various reports and/or reporting tools is provided through a conditional access web portal designed for such a purpose. In one embodiment, the system enables output of each report in the form of physical printing to paper, and/or digital printing using systems such as Adobe Acrobat, or the like.

With reference to FIG. 9, in one embodiment, the broadcast scanning system 160 provides device usage, preferences, historical analysis, combinations of the same, or the like to the broadcast receiving devices 140, 640 and/or 740. In another embodiment, the broadcast scanning system 160 provides various usage patterns of the broadcast receiving systems (most popular, recommended, peer to peer sharing, accessed broadcast streams 121, combinations of the same, or the like.) to the broadcast sources 120. In one example, the information is provided in an anonymous format. In yet another example, the broadcasting scanning system 160 provides the mined information to third party entities such as marketing firms, research universities, wireless service providers, content programmers, combinations of the same, or the like. In some circumstance third party entities could be represented by third party database 143.

Figure 11:
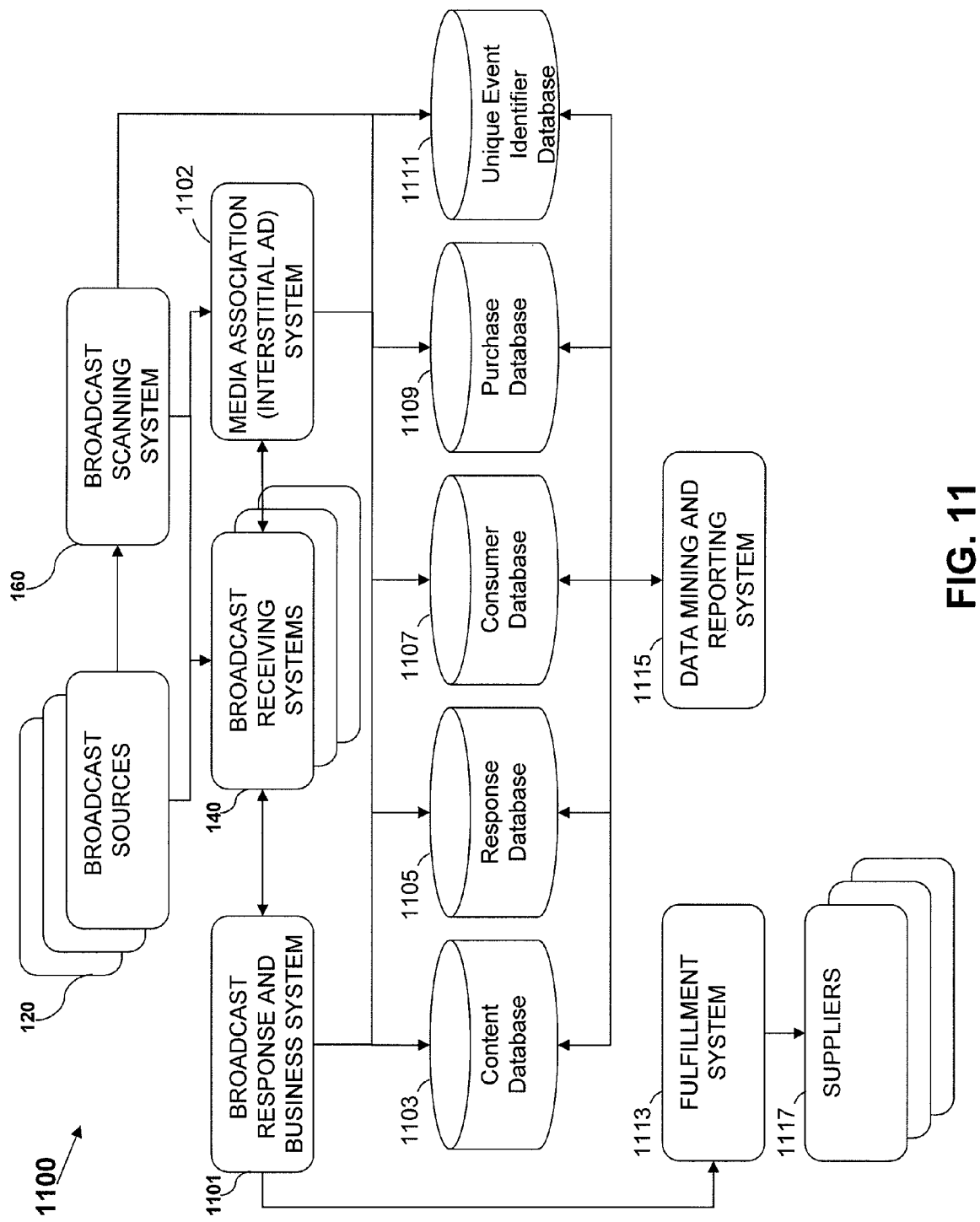
FIG. 11 illustrates one embodiment of a broadcast scanning system comprising a broadcast response and business system.

With reference to FIG. 11, the various embodiments of the broadcast scanning system 160 may be used in a variety of systems and contexts. FIG. 11 illustrates such an example context. In the illustrated example, a plurality of broadcast sources 120 broadcast various media content in a plurality of broadcast streams 121, which are received by the broadcast scanning system 160. The broadcast scanning system 160 may be expressed in the form of any of the embodiments of the broadcast scanning system that are disclosed herein. In one embodiment, the broadcast scanning system 160 is configured to: analyze the broadcast streams 121 received from the plurality of broadcast sources 120 to obtain and/or identify the media content transmitted in the broadcast streams; obtain additional information about the media content if available; and/or assign a unique event identifier specific to the broadcast of each specific broadcast stream and/or media segment. In one embodiment, the broadcast scanning system 160 transmits the unique event identifier to the media association system 1102. Methods and systems of how the unique event identifier is associated with advertising media are disclosed in detail in co-pending U.S. patent application Ser. No. 12/366,535, filed Feb. 5, 2009, titled "SYSTEM AND METHOD FOR ADVERTISEMENT TRANSMISSION AND DISPLAY," which is incorporated by reference in its entirety. In one embodiment, the broadcast scanning system 160 stores the unique event identifier in the unique event identifier database 1111. In one embodiment, the unique event identifier that is stored in the unique event identifier database 1111 is database-linked with the corresponding and/or associated content and/or content identifiers that are stored in the content database 1103.

Referring to FIG. 11, in one embodiment, the broadcast scanning system 160 further broadcasts and/or transmits over a network to the broadcast receiving systems 140. In one embodiment, the unique event identifier is transmitted through the internet and/or over a wireless/cellular network to a mobile device operating a software application (for example, a Java J2ME, WiFi, BREW, Symbian, Mac OSX, Windows Mobile, combinations of the same, or the like, software application) capable of accessing the internet through the wireless/cellular network. After a broadcast receiving system 140, 640 and/or 740 receives a broadcast stream from a broadcast source 120, and/or receives a corresponding unique event identifier from the broadcast scanning system 160, the broadcast receiving system 140, 640 and/or 740 is configured to receive a user selection or user input. After the broadcast receiving system 140, 640 and/or 740 receives the user selection or user input, the broadcast receiving system 140, 640 and/or 740 is configured, in one embodiment, to transmit to the broadcast response and business system 1101 at least the unique event identifier and/or a user identifier.

In further reference to FIG. 11, in one embodiment, the broadcast response and business system 1101 is configured to connect to the unique event identifier database 1111 in order to perform a database lookup of the received unique event identifier. From the database lookup, the broadcast response business system 1101 can determine the broadcast source 120, the time and/or date of the broadcast, and/or the content associated with the broadcast. The broadcast response business system 1101 is configured in one embodiment to locate in the content database 1103 the content and if available, the content identifier associated with the broadcast based on the database lookup. In one embodiment, the broadcast response business system 1101 is configured to store the user selection and/or the user response in the response database 1105.

With reference to FIG. 11, if the user selected to purchase the content associated with the unique event identifier, then the broadcast response and business system 1101 is configured in one embodiment to verify the user identifier in the consumer database 1107, which stores, for example, user name, address, demographic data, and/or other similar user information. The broadcast response business system 1101 in one embodiment is configured to store the purchase event in the purchase database 1109. The purchase database 1109 is configured to store, for example, past user purchases, user credit card information, user billing information, user preferences, user telephone information for billing the user cellular account, age, gender, location, mobile operator, favorite media streams, preferred language, cultural or political affinities, receiving device model, combinations of the same, or the like. In one embodiment, the broadcast response business system 1101 is configured to transmit the purchase selection to the fulfillment system 1113. The fulfillment system 1113 can also be configured to ship from a supplier 1117 to the user a physical product, for example, a CD and/or book, and in other embodiments, the fulfillment system 1113 is configured to inform the user where to download the digital content, and/or electronically transmits the content to the user.

Referring to FIG. 11, in one embodiment, the data mining and reporting system 1115 is configured to connect to the content database 1103, the response database 1105, the consumer database 1107, the purchase database 1109, and/or the unique event identifier database to conduct data mining and/or reporting. In one embodiment, the data mining and reporting system 1115 is configured to identify based on the unique event identifier the broadcast source, the broadcast segment, and/or the time and/or date of the broadcast segment that produced the most user responses in a given period. In certain embodiments, the various databases 1103, 1105, 1107, 1109, and/or 111 may be combined into one or more databases.

As illustrated in FIG. 11, in one embodiment, the media association system 1102 is configured to receive the unique event identifier from the broadcast scanning system 160. The media association system 1102 in one embodiment is configured to identify the content associated with the unique event identifier by performing a database lookup using the unique event identifier database 1111 and/or cross reference the content database 1103. The media association system 1102 can also be configured to compare the content with a database to determine whether an associated media stream and/or content should be transmitted to broadcast receiving systems 140, 640 and/or 740 that are displaying and/or outputting the content associated with the unique event identifier. For example, the media association system 1102 is configured in one embodiment to display an advertisement next to a graphic representing a specific music artist and/or advertiser featured in the content received from a broadcast source 120 and outputted on the broadcast receiving system 140, 640 and/or 740. Methods and systems of how the unique event identifier is associated with advertising media are disclosed in detail in co-pending U.S. patent application Ser. No. 12/366,535, filed Feb. 5. 2009titled "SYSTEM AND METHOD FOR ADVERTISEMENT TRANSMISSION AND DISPLAY," which is incorporated by reference in its entirety.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

In certain embodiments, the acts, methods, and processes described herein are implemented within, or using, software modules (programs) that are executed by one or more general purpose computers. The software modules may be stored on or within any suitable computer-readable medium. It should be understood that the various steps may alternatively be implemented in-whole or in-part within specially designed hardware. The skilled artisan will recognize that not all calculations, analyses and/or optimization require the use of computers, though any of the above-described methods, calculations or analyses can be facilitated through the use of computers.

Although the foregoing systems and methods have been described in terms of certain preferred embodiments, other embodiments will be apparent to those of ordinary skill in the art from the disclosure herein. Additionally, other combinations, omissions, substitutions and modifications will be apparent in view of the disclosure herein. While certain embodiments of the inventions have been described, these embodiments have been presented by way of example only, and are not intended to limit the scope of the inventions. Indeed, the novel methods and systems described herein may be embodied in a variety of other forms without departing from the spirit thereof. Further, the disclosure herein of any particular feature, aspect, method, property, characteristic, quality, attribute, element, or the like in connection with an embodiment can be used in all other embodiments set forth herein. Accordingly, other combinations, omissions, substitutions and modifications will be apparent in view of the disclosure herein.

What is claimed is:

1. A broadcast scanning system comprising:
    a stream scanner module to receive a specific broadcast stream from a broadcast source and extract associated third party encoded data encoded corollary to the specific broadcast stream, wherein the specific broadcast stream comprises at least a media content;
    a stream analysis module to analyze the specific broadcast stream to initiate an identification of the media content in the specific broadcast stream, wherein the initiation is based at least in part on the associated third party encoded data;
    a scanning management system module to package data preparatory to a database entry comprising at least part of the analysis from the stream analysis module;
    a management module to process the database entry and to generate a unique event identifier specific to an instance of reception of the associated third party encoded data;
    a media storage database module to store in a media storage database at least the unique event identifier specific to the instance of reception of the associated third party encoded data and the database entry, wherein the unique event identifier specific to the instance of reception of the associated third party encoded data is database linked to the database entry;
    a device monitoring module to transmit the unique identifier specific to the instance of reception of the associated third party encoded data to at least one of the plurality of broadcast receiving devices; and
    one or more computers to operate the stream scanner module, stream analysis module, scanning management system module, management module, media storage database module, and device monitoring module, wherein the one or more computers comprises a computer processor and an electronic storage medium.

2. The method of claim 1, wherein the unique event identifier specific to the instance of reception of the associated third party encoded data is database indexed to data that enables the unique identification of a specific instance of transmission of the media segment.

* * * * *